United States Patent
Sareen et al.

(10) Patent No.: US 9,329,774 B2
(45) Date of Patent: May 3, 2016

(54) SWITCHING BACK TO A PREVIOUSLY-INTERACTED-WITH APPLICATION

(71) Applicant: Microsoft Technology Licensing, LLC, Redmond, WA (US)

(72) Inventors: Chaitanya Dev Sareen, Seattle, WA (US); Tsz Yan Wong, Seattle, WA (US); Jesse Clay Satterfield, Seattle, WA (US); Matthew I. Worley, Bellevue, WA (US); Bret P. Anderson, Kirkland, WA (US); Nils A. Sundelin, Bothell, WA (US); Patrice L. Miner, Kirkland, WA (US); Jennifer Nan, Seattle, WA (US); Robert J. Jarrett, Snohomish, WA (US); David A. Matthews, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/658,694

(22) Filed: Oct. 23, 2012

(65) Prior Publication Data

US 2013/0047126 A1 Feb. 21, 2013

Related U.S. Application Data

(63) Continuation of application No. 13/118,302, filed on May 27, 2011.

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/04886* (2013.01); *G06F 3/0482* (2013.01); *G06F 3/04817* (2013.01); *G06F 3/04842* (2013.01)

(58) Field of Classification Search
CPC . G06F 3/0481; G06F 3/04842; G06F 3/0482; G06F 3/04817; G06F 3/0488; G06F 3/0484
USPC ......... 715/702, 718, 738, 739, 744–745, 763, 715/766, 767, 769, 778, 783, 789, 794, 795, 715/796, 797, 802, 804, 806, 807, 863, 864
See application file for complete search history.

(56) References Cited

U.S. PATENT DOCUMENTS

| 4,823,283 A | 4/1989 | Diehm et al. |
| 5,045,997 A | 9/1991 | Watanabe |

(Continued)

FOREIGN PATENT DOCUMENTS

| CN | 1129889 | 8/1996 |
| CN | 1591398 | 3/2005 |

(Continued)

OTHER PUBLICATIONS

"Non-Final Office Action", U.S. Appl. No. 12/977,584, (Dec. 7, 2012), 8 pages.

(Continued)

*Primary Examiner* — Tuyetlien T Tran
*Assistant Examiner* — Jamie Duckworth
(74) *Attorney, Agent, or Firm* — Jim Banowsky; Judy Yee; Micky Minhas

(57) ABSTRACT

This document describes techniques and apparatuses for switching back to a previously-interacted-with application. In some embodiments, these techniques and apparatuses enable selection of a user interface not currently exposed on a display through a simple gesture that is both easy-to-use and remember.

20 Claims, 19 Drawing Sheets

(51) Int. Cl.
*G06F 3/0482* (2013.01)
*G06F 3/0481* (2013.01)
*G06F 3/0484* (2013.01)

(56) References Cited

U.S. PATENT DOCUMENTS

| | | |
|---|---|---|
| 5,046,001 A | 9/1991 | Barker et al. |
| 5,189,732 A | 2/1993 | Kondo |
| 5,258,748 A | 11/1993 | Jones |
| 5,297,032 A | 3/1994 | Trojan et al. |
| 5,305,435 A | 4/1994 | Bronson |
| 5,321,750 A | 6/1994 | Nadan |
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,490,241 A | 2/1996 | Mallgren et al. |
| 5,515,495 A | 5/1996 | Ikemoto |
| 5,568,604 A | 10/1996 | Hansen |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,675,329 A | 10/1997 | Barker |
| 5,680,562 A | 10/1997 | Conrad et al. |
| 5,687,331 A | 11/1997 | Volk et al. |
| 5,712,995 A | 1/1998 | Cohn |
| 5,740,389 A | 4/1998 | Li et al. |
| 5,771,042 A | 6/1998 | Santos-Gomez |
| 5,793,415 A | 8/1998 | Gregory et al. |
| 5,819,284 A | 10/1998 | Farber et al. |
| 5,847,706 A | 12/1998 | Kingsley |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,311,058 B1 | 10/2001 | Wecker et al. |
| 6,313,854 B1 | 11/2001 | Gibson |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,658,147 B2 | 12/2003 | Gorbatov et al. |
| 6,662,023 B1 | 12/2003 | Helle |
| 6,697,825 B1 | 2/2004 | Underwood et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,727,892 B1 | 4/2004 | Murphy |
| 6,784,925 B1 | 8/2004 | Tomat |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,880,132 B2 | 4/2005 | Uemura |
| 6,885,974 B2 | 4/2005 | Holle |
| 6,904,597 B2 | 6/2005 | Jin |
| 6,938,101 B2 | 8/2005 | Hayes et al. |
| 6,961,731 B2 | 11/2005 | Holbrook |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,111,044 B2 | 9/2006 | Lee |
| 7,133,707 B1 | 11/2006 | Rak et al. |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,348,965 B2 | 3/2008 | Itoh |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,409,646 B2 | 8/2008 | Vedbrat et al. |

(56) References Cited

U.S. PATENT DOCUMENTS

| | | |
|---|---|---|
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,549,131 B2 | 6/2009 | Lengeling et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,676,767 B2 | 3/2010 | Hofmeister et al. |
| 7,702,683 B1 | 4/2010 | Kirshenbaum |
| 7,755,674 B2 | 7/2010 | Kaminaga |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,924,271 B2 | 4/2011 | Christie et al. |
| 7,933,632 B2 | 4/2011 | Flynt et al. |
| 7,983,718 B1 | 7/2011 | Roka |
| 7,987,431 B2 | 7/2011 | Santoro et al. |
| 7,996,045 B1 | 8/2011 | Bauer et al. |
| 8,006,276 B2 | 8/2011 | Nakagawa et al. |
| 8,065,629 B1 | 11/2011 | Ragan |
| 8,086,275 B2 | 12/2011 | Wykes |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,238,876 B2 | 8/2012 | Teng |
| 8,250,494 B2 | 8/2012 | Butcher |
| 8,255,473 B2 | 8/2012 | Eren et al. |
| 8,269,736 B2 | 9/2012 | Wilairat |
| 8,384,726 B1 | 2/2013 | Grabowski et al. |
| 8,473,871 B1 | 6/2013 | Sandler et al. |
| 8,525,808 B1 | 9/2013 | Buening |
| 8,549,432 B2 | 10/2013 | Warner |
| 8,589,815 B2 | 11/2013 | Fong et al. |
| 8,595,642 B1 | 11/2013 | Lagassey |
| 8,612,874 B2 | 12/2013 | Zaman et al. |
| 8,627,227 B2 | 1/2014 | Matthews et al. |
| 8,713,463 B2 | 4/2014 | Kim et al. |
| 8,726,190 B2 | 5/2014 | Clark et al. |
| 8,769,427 B2 | 7/2014 | Raman et al. |
| 8,826,181 B2 | 9/2014 | Mouilleseaux et al. |
| 8,893,033 B2 | 11/2014 | Donahue et al. |
| 8,933,952 B2 | 1/2015 | Zaman et al. |
| 8,994,697 B2 | 3/2015 | Lin et al. |
| 9,015,606 B2 | 4/2015 | Zaman et al. |
| 9,052,820 B2 | 6/2015 | Jarrett et al. |
| 9,092,132 B2 | 7/2015 | Migos et al. |
| 9,098,186 B1 | 8/2015 | Worley et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,229,918 B2 | 1/2016 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0158838 A1 | 10/2002 | Smith et al. |
| 2002/0161634 A1 | 10/2002 | Kaars |
| 2002/0165923 A1 | 11/2002 | Prince |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0095395 A1 | 5/2004 | Kurtenbach |
| 2004/0111673 A1 | 6/2004 | Bowman et al. |
| 2004/0155908 A1 | 8/2004 | Wagner |
| 2004/0174396 A1* | 9/2004 | Jobs et al. ..................... 345/810 |
| 2004/0185883 A1 | 9/2004 | Rukman |
| 2004/0212586 A1 | 10/2004 | Denny |
| 2004/0212605 A1 | 10/2004 | Fitzmaurice et al. |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0143138 A1 | 6/2005 | Lee et al. |
| 2005/0149879 A1 | 7/2005 | Jobs et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |

(56) References Cited

U.S. PATENT DOCUMENTS

| | | |
|---|---|---|
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0161863 A1 | 7/2006 | Gallo |
| 2006/0172724 A1 | 8/2006 | Linkert et al. |
| 2006/0173911 A1 | 8/2006 | Levin et al. |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0232551 A1 | 10/2006 | Matta |
| 2006/0236264 A1 | 10/2006 | Cain et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0284852 A1 | 12/2006 | Hofmeister et al. |
| 2006/0288280 A1 | 12/2006 | Makela |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067738 A1* | 3/2007 | Flynt ................ H04M 1/72522 715/810 |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0127638 A1 | 6/2007 | Doulton |
| 2007/0140566 A1 | 6/2007 | Lin et al. |
| 2007/0157089 A1 | 7/2007 | Van Os et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0220444 A1 | 9/2007 | Sunday et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0001924 A1 | 1/2008 | de los Reyes et al. |
| 2008/0005668 A1 | 1/2008 | Mavinkurve |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0109753 A1* | 5/2008 | Karstens ................... 715/802 |
| 2008/0113656 A1 | 5/2008 | Lee et al. |
| 2008/0114535 A1 | 5/2008 | Nesbitt |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss et al. |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0208973 A1 | 8/2008 | Hayashi |

(56) References Cited

U.S. PATENT DOCUMENTS

| | | |
|---|---|---|
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion et al. |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058821 A1 | 3/2009 | Chaudhri |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel |
| 2009/0085886 A1 | 4/2009 | Huang et al. |
| 2009/0089215 A1 | 4/2009 | Newton |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0132942 A1 | 5/2009 | Santoro et al. |
| 2009/0140061 A1 | 6/2009 | Schultz et al. |
| 2009/0140986 A1 | 6/2009 | Karkkainen et al. |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0171920 A1 | 7/2009 | Wade et al. |
| 2009/0178007 A1 | 7/2009 | Matas et al. |
| 2009/0182788 A1 | 7/2009 | Chung et al. |
| 2009/0187860 A1 | 7/2009 | Fleck et al. |
| 2009/0193358 A1 | 7/2009 | Mernyk et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0249247 A1 | 10/2009 | Tseng et al. |
| 2009/0265662 A1 | 10/2009 | Bamford |
| 2009/0271778 A1 | 10/2009 | Mandyam et al. |
| 2009/0278812 A1 | 11/2009 | Yasutake |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1* | 11/2009 | Duarte et al. ................ 715/767 |
| 2009/0293013 A1 | 11/2009 | O'Shaugnessy et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2009/0322760 A1 | 12/2009 | Kwiatkowski |
| 2010/0008490 A1 | 1/2010 | Gharachorloo et al. |
| 2010/0010934 A1 | 1/2010 | Barry et al. |
| 2010/0013782 A1 | 1/2010 | Liu et al. |
| 2010/0020025 A1 | 1/2010 | Lemort et al. |
| 2010/0030578 A1 | 2/2010 | Siddique et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0062811 A1 | 3/2010 | Park et al. |
| 2010/0064261 A1 | 3/2010 | Andrews et al. |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0122208 A1 | 5/2010 | Herr et al. |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185989 A1 | 7/2010 | Shiplacoff et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0259493 A1 | 10/2010 | Chang et al. |
| 2010/0281409 A1 | 11/2010 | Rainisto et al. |

(56) References Cited

U.S. PATENT DOCUMENTS

| | | |
|---|---|---|
| 2010/0281481 A1 | 11/2010 | Rainisto et al. |
| 2010/0283743 A1 | 11/2010 | Coddington et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302148 A1 | 12/2010 | Tanabe et al. |
| 2010/0302172 A1 | 12/2010 | Wilairat |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029934 A1 | 2/2011 | Locker et al. |
| 2011/0032365 A1 | 2/2011 | Yett |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0078624 A1 | 3/2011 | Missig et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0102464 A1 | 5/2011 | Godavari |
| 2011/0107272 A1 | 5/2011 | Aguilar |
| 2011/0119586 A1 | 5/2011 | Blinnikka et al. |
| 2011/0124376 A1 | 5/2011 | Kim et al. |
| 2011/0138313 A1 | 6/2011 | Decker et al. |
| 2011/0154235 A1 | 6/2011 | Min et al. |
| 2011/0167341 A1 | 7/2011 | Cranfill et al. |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175821 A1 | 7/2011 | King |
| 2011/0175930 A1 | 7/2011 | Hwang et al. |
| 2011/0179386 A1 | 7/2011 | Shaffer et al. |
| 2011/0179387 A1* | 7/2011 | Shaffer et al. ............... 715/835 |
| 2011/0181617 A1 | 7/2011 | Tsuda et al. |
| 2011/0185318 A1 | 7/2011 | Hinckley et al. |
| 2011/0191675 A1 | 8/2011 | Kauranen |
| 2011/0209099 A1 | 8/2011 | Hinckley |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2012/0009903 A1 | 1/2012 | Schultz et al. |
| 2012/0017162 A1 | 1/2012 | Khokhlov |
| 2012/0028687 A1 | 2/2012 | Wykes |
| 2012/0050185 A1 | 3/2012 | Davydov et al. |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0162266 A1 | 6/2012 | Douglas et al. |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0176401 A1 | 7/2012 | Hayward et al. |
| 2012/0179992 A1 | 7/2012 | Smuga |
| 2012/0180001 A1* | 7/2012 | Griffin et al. ................ 715/863 |
| 2012/0210265 A1 | 8/2012 | Delia et al. |
| 2012/0212495 A1 | 8/2012 | Butcher |
| 2012/0218192 A1 | 8/2012 | Lazaridis et al. |
| 2012/0226971 A1 | 9/2012 | Tocchini et al. |
| 2012/0233571 A1 | 9/2012 | Wever et al. |
| 2012/0236035 A1 | 9/2012 | Kimura |
| 2012/0244841 A1 | 9/2012 | Teng |
| 2012/0254780 A1 | 10/2012 | Mouton |
| 2012/0284673 A1 | 11/2012 | Lamb et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2013/0007665 A1 | 1/2013 | Chaudhri et al. |
| 2013/0042203 A1 | 2/2013 | Wong et al. |
| 2013/0047079 A1 | 2/2013 | Kroeger et al. |
| 2013/0047105 A1 | 2/2013 | Jarrett |
| 2013/0057587 A1 | 3/2013 | Leonard et al. |
| 2013/0063442 A1 | 3/2013 | Zaman |
| 2013/0063465 A1 | 3/2013 | Zaman |
| 2013/0067412 A1 | 3/2013 | Leonard |
| 2013/0117715 A1 | 5/2013 | Williams et al. |
| 2014/0082552 A1 | 3/2014 | Zaman |
| 2014/0098108 A1 | 4/2014 | Fong et al. |
| 2015/0046829 A1 | 2/2015 | Donahue et al. |
| 2015/0193403 A1 | 7/2015 | Zaman et al. |
| 2015/0317062 A1 | 11/2015 | Jarrett et al. |
| 2015/0378554 A1 | 12/2015 | Jan et al. |
| 2015/0378594 A1 | 12/2015 | Zaman et al. |

FOREIGN PATENT DOCUMENTS

| | | |
|---|---|---|
| CN | 1734440 | 2/2006 |
| CN | 1902575 | 1/2007 |
| CN | 1904823 | 1/2007 |
| CN | 1930568 | 3/2007 |
| CN | 101036104 | 9/2007 |
| CN | 101346688 | 1/2009 |
| CN | 102004603 | 4/2011 |
| CN | 102033710 | 4/2011 |
| CN | 102197702 | 9/2011 |
| CN | 102460370 | 5/2012 |
| EP | 0583060 | 2/1994 |
| EP | 1353505 | 10/2003 |
| EP | 1752868 | 2/2007 |
| EP | 1939718 | 7/2008 |
| EP | 1962480 | 8/2008 |
| EP | 2045700 | 4/2009 |
| EP | 2172836 | 4/2009 |
| EP | 2076000 | 7/2009 |
| EP | 2262193 | 12/2010 |
| EP | 2659347 | 11/2013 |
| GB | 2350991 | 12/2000 |
| JP | 2000347645 | 12/2000 |
| JP | 2002055753 | 2/2002 |
| JP | 2003513350 | 4/2003 |
| JP | 2003195998 | 7/2003 |
| JP | 2004227393 | 8/2004 |
| JP | 2004357257 | 12/2004 |
| JP | 2006268849 | 10/2006 |
| JP | 2007058740 | 3/2007 |
| JP | 2007148783 | 6/2007 |
| JP | 2007195186 | 8/2007 |
| JP | 2009266192 | 11/2009 |
| JP | 2010039761 | 2/2010 |
| JP | 2010073099 | 4/2010 |
| JP | 20100090931 | 4/2010 |
| JP | 2010108273 | 5/2010 |
| JP | 2011048835 | 3/2011 |
| JP | 2011070525 | 4/2011 |
| JP | 2011516936 | 5/2011 |
| JP | 2011221821 | 11/2011 |
| JP | 2012514811 | 6/2012 |
| JP | 2012527684 | 11/2012 |
| KR | 200303655 | 2/2003 |

(56) References Cited

FOREIGN PATENT DOCUMENTS

| | | |
|---|---|---|
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| WO | WO-9926127 | 5/1999 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010080258 | 7/2010 |
| WO | WO-2010089980 | 8/2010 |
| WO | WO-2010092993 | 8/2010 |
| WO | WO-2010110613 | 9/2010 |
| WO | WO-2010117643 | 10/2010 |
| WO | WO-2010119356 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |

OTHER PUBLICATIONS

"Non-Final Office Action", U.S. Appl. No. 13/118,339, (Feb. 11, 2013), 15 pages.
"Non-Final Office Action", U.S. Appl. No. 13/118,347, (Feb. 12, 2013), 14 pages.
"Non-Final Office Action", U.S. Appl. No. 13/224,258, (Jan. 8, 2013), 35 pages.
"Non-Final Office Action", U.S. Appl. No. 13/657,621, (Feb. 7, 2013), 19 pages.
"Non-Final Office Action", U.S. Appl. No. 13/657,646, (Jan. 3, 2013), 13 pages.
"PCT Search Report and Written Opinion", Application No. PCT/US2011/067075, (Dec. 12, 2012), 10 pages.
Livingston, et al., "Windows 95 Secrets", (1995),*IDG Books Worldwide*, 3rd Edition, (1995), pp. 121-127.
Perry, Greg "Teach Yourself Windows 95 in 24 Hours", 1997, *Sams Publishing*, 2nd Edition, (1997), pp. 193-198.
"Adobe Acrobat 8 Standard User Guide", Adobe Systems Incorporated,(2007),pp. 34 & 36.
"Advisory Action", U.S. Appl. No. 12/414,382, (Jan. 20, 2012),3 pages.
"Advisory Action", U.S. Appl. No. 12/433,605, (Apr. 5, 2012),3 pages.
"Alltel Adds Dedicated Search Key to Phones", Retrieved from: <http://www.phonescoop.com/news/item.php?n=2159> on Nov. 26, 2008., (Apr. 12, 2007),2 Pages.
"Android 2.3 User's Guide", AUG-2.3-103, Android mobile technology platform 2.3,(Dec. 13, 2010),380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.

"Application User Model IDs", Retrieved from: <http://msdn.microsoft.com/en-us/library/dd378459(VS.85).aspx> on Sep. 28, 2010, (2010),6 pages.
"Ask Web Hosting", Retrieved from: <http://www.askwebhosting.com/story/18501/HTC_FUZE_From_ATandampT_Fuses_Fun_Function_With_the_One-Touch_Power_of_TouchFLO_3D.html> on May 5, 2009., (Nov. 11, 2008),3 pages.
"Basics of Your Device: Get Familiar with the Home Screen", Nokia USA—How to, retrieved from <http://www.nokia.ca/get-support-and-software/product-support/c6-01/how-to#> on May 11, 2011,3 pages.
"Blackberry office tools: Qwerty Convert", Retrieved from: <http://blackberrysoftwarelist.net/blackberry/download-software/blackberry-office/qwerty_convert.aspx> on Nov. 20, 2008,1 page.
"Calc4M", Retrieved from: <http://www.hellebo.com/Calc4M.html> on Dec. 11, 2008, (Sep. 10, 2008),4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009),5 Pages.
"Dial a number", Retrieved from: <http://www.phonespell.org/ialhelp.html> on Nov. 20, 2008,1 page.
"DuoSense™ Multi-Touch Gestures", Retrieved from: <http://www.n-trig.com/Data/Uploads/Misc/DuoSenseMTG_final.pdf>, (Jul. 2008),4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),2 pages.
"Email Notification for Microsoft Outlook and Outlook Express", Retrieved from: <http://www.contextmagic.com/express-notification/>on Sep. 29, 2010, (Jul. 21, 2004),3 pages.
"Enhanced IBM Power Systems Software and PowerVM Restructuring", *IBM United States Announcement 208-082*, dated Apr. 8, 2008 available at <http://www.ibm.com/common/ssi/rep_ca/2/897/ENUS208-082/ENUS208082.PDF>,(Apr. 8, 2008),pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 20, (Aug. 1, 2008),14 pages.
"Extended European Search Report", European Patent Application No. 09818253.8, (Apr. 10, 2012),7 pages.
"eXtreme Energy Conservation: Advanced Power-Saving Software for Wireless Devices", *White Paper, Freescale Semiconductor, Inc.*, Document No. XTMENTGYCNSVWP, Rev #0, available at <http://www.freescale.com/files/32bit/doc/white_paper/XTMENRGYCNSVWP.pdf>,(Feb. 2006),15 pages.
"Final Office Action", U.S. Appl. No. 11/305,789, (Apr. 1, 2009),10 pages.
"Final Office Action", U.S. Appl. No. 11/502,264, (Feb. 4, 2010),15 pages.
"Final Office Action", U.S. Appl. No. 11/502,264, (Apr. 3, 2009),9 pages.
"Final Office Action", U.S. Appl. No. 12/244,545, (Dec. 7, 2011),16 pages.
"Final Office Action", U.S. Appl. No. 12/244,545, (Sep. 7, 2012),23 pages.
"Final Office Action", U.S. Appl. No. 12/413,977, (Nov. 17, 2011),16 pages.
"Final Office Action", U.S. Appl. No. 12/414,382, (Dec. 23, 2011),7 pages.
"Final Office Action", U.S. Appl. No. 12/414,476, (Dec. 1, 2011),20 pages.
"Final Office Action", U.S. Appl. No. 12/433,605, (Feb. 3, 2012),11 pages.
"Final Office Action", U.S. Appl. No. 12/433,667, (Sep. 13, 2011),17 pages.
"Final Office Action", U.S. Appl. No. 12/469,458, (Nov. 17, 2011),15 pages.

(56) References Cited

OTHER PUBLICATIONS

"Final Office Action", U.S. Appl. No. 12/469,480, (Feb. 9, 2012),17 pages.
"Final Office Action", U.S. Appl. No. 12/484,799, (Apr. 30, 2012),13 pages.
"Final Office Action", U.S. Appl. No. 12/560,081, (Mar. 14, 2012),16 pages.
"Freeware.mobi", Retrieved from: <http://www.palmfreeware.mobi/download-palette.html> on Nov. 6, 2008, (Oct. 9, 2001),2 pages.
"GnomeCanvas", Retrieved from: <http://library.gnome.org/devel/libgnomecanyas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010),1 page.
"How do I use Categories with my Weblog?", Retrieved from: <http://tpsupport.mtcs.sixapart.com/tp/us-tp1/how_13 do_i_use_categories_with_my_weblog.html>, on Sep. 28, 2010, (Sep. 16, 2009),3 pages
"How do you dail 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007),24 pages.
"HTC Shows HTC Snap with Snappy Email Feature", Retrieved from: <http://www.wirelessandmobilenews.com/smartphones/ on May 5, 2009>, (May 4, 2009), 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008),11 pages.
"International Search Report and Written Opinion", International Application No. PCT/US2011/055521, (May 15, 2012),9 pages.
"International Serch Report and Written Opinion", International Application No. PCT/US2011/055522, (May 15, 2012),9 pages.
"International Search Report and Written Opinion", International Application No. PCT/US2011/055514, (May 22, 2012),8 pages.
"International Search Report", Application No. PCT/US2010/028553, Application Filing Date: Mar. 24, 2010,(Nov. 9, 2010),9 pages.
"Internet Explorer Window Restrictions", Retrieved from: http://technet.microsoft.com/en-us/library/cc759517(WS.10).aspx on Jun. 28, 2011, Microsoft TechNet,5 pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008),pp. 1-7.
"iPad User Guide", retrieved from <http://cyndidannerkuhn.info/CDK/iPads_Resources_files/iPad_User_Guide.pdf> on Jun. 17, 2011,154 pages.
"iPod touch User Guide for iPhone OS 3.0 Software", Apple Inc.,(2009),153 pages.
"Keyboard (5)", Retrieved from: <http://landru.uwaterloo.ca/cgi-bin/man.cgi?section=5&topic=keyboard> on Dec. 11, 2008., (Aug. 11,1997),8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.
"Kiosk Browser Chrome Custimization Firefox 2.x", Retrieved from: <http://stlouis-hopper.com/cgi-bin/mozdev-wiki/,pl?ChromeCustomiztion< on Oct. 22, 2008 Making a new chrome for the kiosk browser, Kiosk Project Kiosk Browser Chrome Customization Firefox-2.x,(Aug. 16, 2007),2 pages.
"Live Photo Gallery—Getting Started—from Camera to Panorama", Retrieved from: <http://webdotwiz.spaces.live.com/blog/cns!2782760752B93233!1729.entry> May 5, 2009., (Sep. 2008),7 Pages.
"Magic mouse", Retrieved from: <http://www.apple.com/magicmouse/> on May 10, 2011,3 pages.

"MIDTP Tip Sheet: Book Courier", Retrieved from: <http://www.midtb.org/tipsbookcourier.htm> Dec. 11, 2008., (Sep. 26, 2005),6 Pages.
"Mobile/UI/Designs/TouchScreen", Retrieved from: <https://wiki.mozilla.org/Mobile/UI/Designs/TouchScreen> on May 6, 2009., (Feb. 3, 2009),15 Pages.
"moGo beta v.0.4", Retrieved from: <http://forum.xda-developers.com/showthread.php?t=375196> on Sep. 27, 2010, (Mar. 7, 2008),10 pages.
"Multi-touch", Retrieved from <http://en.wikipedia.org/wiki/Multi-touch#Microsoft_Surface> on Apr. 24, 2009, (Apr. 17, 2009),8 pages.
"New Features in WhatsUp Gold v12.0", retrieved from <http://www.netbright.co.th/?name=product&file=readproduct&id=12> on Jun. 10, 2011,4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
"Non-Final Office Action", U.S. Appl. No. 11/215,052, (Jun. 23, 2011),17 pages.
"Non-Final Office Action", U.S. Appl. No. 11/305,789, (Sep. 21, 2009),5 pages.
"Non-Final Office Action", U.S Appl. No. 11/502,264, (Sep. 30, 2009),15 pages.
"Non-Final Office Action", U.S. Appl. No. 11/502,264, (Sep. 14, 2012),14 pages.
"Non-Final Office Action", U.S. Appl. No. 12/244,545, (Mar. 27, 2012),18 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/413,977, (Jul. 20, 2012),18 pages.
"Non-Final Office Action", U.S. Appl. No. 12/414,382, (Jul. 26, 2011),9 pages.
"Non-Final Office Action", U.S. Appl. No. 12/414,434, (Jan. 17, 2012),7 pages.
"Non-Final Office Action", U.S. Appl. No. 12/414,434, (May 31, 2012),7 pages.
"Non-Final Office Action", U.S. Appl. No. 12/414,434, (Aug. 2, 2011),6 pages.
"Non-Final Office Action", U.S. Appl. No. 12/414,455, (Aug. 29, 2011),8 pages.
"Non-Final Office Action", U.S. Appl. No. 12/414,458, (Jul. 6, 2011),8 pages.
"Non-Final Office Action", U.S. Appl. No. 12/414,476, (Nov. 9, 2012),22 pages.
"Non-Final Office Action", U.S. Appl. No. 12/414,476, (Aug. 3, 2011),21 pages.
"Non-Final Office Action", U.S. Appl. No. 12/433,605, (Jun. 24, 2011),10 pages.
"Non-Final Office Action", U.S. Appl. No. 12/433,667, (Jun. 7, 2011),15 pages.
"Non-Final Office Action", U.S. Appl. No. 12/433,667, (Feb. 3, 2012),16 pages.
"Non-Final Office Action", U.S. Appl. No. 12/469,419, (Nov. 9, 2011),15 pages.
"Non-Final Office Action", U.S. Appl. No. 12/469,419, (May 23, 2012),13 pages.
"Non-Final Office Action", U.S. Appl. No. 12/469,458, (Jul. 1, 2011),15 pages.
"Non-Final Office Action", U.S. Appl. No. 12/469,458, (Sep. 21, 2012),14 pages.
"Non-Final Office Action", U.S. Appl. No. 12/469,480, (Oct. 17, 2012),16 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011),9 pages.
"Non-Final Office Action", U.S. Appl. No. 12/480,969, (Aug. 7, 2012),15 pages.

(56) References Cited

OTHER PUBLICATIONS

"Non-Final Office Action", U.S. Appl. No. 12/484,799, (Aug. 11, 2011),12 pages.
"Non-Final Office Action", U.S. Appl. No. 12/484,799, (Aug. 7, 2012),13 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Non-Final Office Action", U.S. Appl. No. 12/983,106, (Nov. 9, 2012),17 pages.
"Non-Final Office Action", U.S. Appl. No. 13/492,495, (Sep. 17, 2012),8 pages.
"Notice of Allowance", U.S. Appl. No. 11/215,052, (Mar. 14, 2012),5 pages.
"Notice of Allowance", U.S. Appl. No. 11/305,789, (Nov. 23, 2009),8 pages.
"Notice of Allowance", U.S. Appl. No. 12/414,382, (Apr. 4, 2012),4 pages.
"Notice of Allowance", U.S. Appl. No. 12/414,434, (Aug. 17, 2012),4 pages.
"Notice of Allowance", U.S. Appl. No. 12/414,455, (Jan. 4, 2012),4 pages.
"Notice of Allowance", U.S. Appl. No. 12/414,458, (Oct. 31, 2011),2 pages.
"Notice of Allowance", U.S. Appl. No. 12/414,458, (Nov. 29, 2011),2 pages.
"Notice of Allowance", U.S. Appl. No. 12/414,458, (Aug. 10, 2011),6 pages.
"Notice of Allowance", U.S. Appl. No. 12/470,558, (Apr. 2, 2012),7 pages.
"Notice of Allowance", U.S. Appl. No. 12/470,558, (Aug. 23, 2012),2 pages.
"Notice of Allowance", U.S. Appl. No. 12/484,799, (Oct. 22, 2012),10 pages.
"Notice of Allowance", U.S. Appl. No. 12/484,845, (Mar. 16, 2012),5 pages.
"Notifications", retrieved from <http://msdn.microsoft.com/en-us/library/aa511497.aspx> on May 10, 2011,16 pages.
"OmneMon™ System Resource Metrics", retrieved from <http://www.omnesys.com/documents/OmneMonSRM_Brochure.pdf> on Jun. 10, 2011,3 pages.
"ONYX Graphics Announces New ONYX Prepedge Job Preparation Software", retrieved from <http://www.largeformatreview.com/rip-software/433-onyx-graphics-announces-new-onyx-> on May 10, 2011,2 pages.
"Oracle8i Application Developers Guide—Advanced Queuing Release 2 (8.1.6)", Retrieved from: http://www.cs.otago.ac.nz/oradocs/appdev.817/a76938/adq01in5.htm on May 5, 2009., (Dec. 1999),8 pages.
"Oracle8i Application Developers Guide—Advanced Queuing", Retrieved from: http://www.cs.umbc.edu/help/oracle8/server.815/a68005/03_adq1i.htm on May 6, 2009., (Feb. 1999),29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com /symbian> on Nov. 6, 2008, (Jan. 21, 2003),2 pages.
"Parallax Scrolling", Retrieved from: <http://en.wikipedia.org/wiki/Parallax_scrolling> on May 5, 2009., (May 4, 2009),3 Pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2011/055511, (Apr. 24, 2012),9 pages.
"PCT Search Report and Written Opinion", Application No. PCT/US2011/055520, (May 9, 2012), 8 pages.
"PCT Search Report and Written Opinion", Application No. PCT/US2011/055523, (May 10, 2012),9 pages.
"PCT Search Report and Written Opinion", Application No. PCT/US2011/055513, (Mar. 27, 2012),8 pages.
"PCT Search Report and Written Opinion", Application No. PCT/US2011/055512, (Mar. 24, 2012),8 pages.
"PCT Search Report and Written Opinion", Application No. PCT/US2011/055524, (Jun. 1, 2012),8 pages.
"PCT Search Report and Written Opinion", Application No. PCT/US2011/065702, (Aug. 29, 2012),8 pages.
"PCT Search Report and Written Opinion", Application No. PCT/US2011/055712, (Sep. 21, 2012),9 pages.
"PCT Search Report and Written Opinion", Application No. PCT/US2011/055736, (Sep. 17, 2012),8 pages.
"PCT Search Report and Written Opinion", Application No. PCT/US2011/055496, (Sep. 12, 2012),9 pages.
"PCT Search Report and Written Opinion", Application No. PCT/US2011/067073, (Sep. 17, 2012),8 pages.
"PCT Search Report and Written Opinion", Application No. PCT/US2011/055746, (Sep. 27, 2012),9 pages.
"PCT Search Report and Written Opinion", Application No. PCT/US2011/055725, (Sep. 27, 2012),10 pages.
"PCT Search Report and Written Opinion", Application No. PCT/US2011/055478, (Sep. 27, 2012),9 pages.
"PCT Search Report and Written Opinion", Application No. PCT/US2011/055493, (Sep. 26, 212),9 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.
"Push Notifications Overview for Windows Phone", Retrieved from:. <http://msdn.microsoft.com/en-us/library/ff402558%28VS.92%29.aspx> on Sep. 30, 2010, (Sep. 3, 2010),1 page.
"Remapping the Keyboard", Retrieved from:.<http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008),3 pages.
"Snap", *Windows 7 Features*, retrieved from <http://windows.microsoft.com/en-US/windows7/products/features/snap> on Sep. 23, 2011,2 pages.
"Symbian Applications", Retrieved from: <http://symbianfullversion.blogspot.com/2008_12 _01_archive.html> on May 5, 2009., (Jan. 2009),51 Pages.
"The Map Screen", retrieved from <http://www.symbianos.org/whereamiusersguide> on Jun. 17, 2011,3 pages.
"Top 3 Task Switchers for Andriod", *TechCredo*, retrieved from <http://www.techcredo.com/android/top-3-task-switchers-for-android> on May 11, 2011,(Mar. 9, 2011),5 pages.
"Top Android App: Swipepad", *Best Android Apps Review*, retrieved from <http://www.bestandroidappsreview.com/2011/01/top-android-app-swipepad-launcher.html> on May 11, 2011,4 pages.
"Touch Shell Free", Retrieved from: <http://www.pocketpcfreeware.mobi/download-touch-shell-free.html> on May 5, 2009., (Feb. 23, 2009),2 Pages.
"User Guide", retrieved from <http://wireframesketcher.com/help/help.html> on Jun. 17, 2011,19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.
"Windows Phone 7 (Push Notification)", retrieved from <http://unknownerror.net/2011-06/windows-phone-7-push-notification-36520> on Jul. 6, 2011,4 pages.
"Windows Phone 7 Live Tiles", Retrieved from: <http://www.knowyourmobile.com/microsoft/windowsphone7/startscreen/640737/window s_phone_7_live_tiles.html> on May 11, 2011,(Oct. 20, 2010),3 pages.

(56) References Cited

OTHER PUBLICATIONS

"Winterface Review", Retrieved from: <http://www.mytodayscreen. com/winterface-review/> on Nov. 12, 2008, (Jul. 9, 2008),42 pages.
"Womma", Retrieved from: <http://www.womma.org/blog/links/ wom-trends/> on May 5, 2009., (2007),70 Pages.
"Working with Multiple Windows", *MSOFFICE tutorial!*, retrieved from <http://www.msoffice-tutorial.com/working-with-multiple-windows.php> on Sep. 23, 2011,3 pages.
"YUI 3: ScrollView [beta]", Retrieved from: <http://developer.yahoo.com/yui/3/scrollview/> on Sep. 28, 2010, 5 pages.
Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996),8 pages.
Beiber, Gerald et al., "Screen Coverage: A Pen-Interaction Problem for PDA's and Touch Screen Computers", In Proceedings of ICWMC 2007,(Mar. 2007),6 pages.
Bjork, Staffan et al., "Redefining the Focus and Context of Focus+Context Visualizations", In *Proceedings of INFOVIS 2000*, Available at <http://www.johan.redstrom.se/papers/redefining. pdf>,(Oct. 2000),9 pages.
Bowes, James et al., "Transparency for Item Highlighting", *Faculty of Computing Science*, Dalhousie University, Available at <http://torch.cs.dal.ca/~dearman/pubs/GI2003-bowes,dearman,perkins-paper.pdf>,(2003),2 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx. ist.psu.edu/viewdoc/download?doi=10.1.1.134.4568&rep=rep1 &type=pdf>,(Sep. 2006),pp. 829-836.
Carrera, Enrique V., et al., "Conserving Disk Energy in Network Servers", available at <http://citeseerx.ist.psu.edu/viewdoc/ download?doi=10.1.1.6.8301&rep=rep1&type=ps>,(Nov. 2002),15 pages.
Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.
Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.
Cohen, Michael F., et al., "Wang Tiles for Image and Texture Generation", In *Proceedings of Siggraph 2003*, Available <http://research.microsoft.com/en-us/um/people/cohen/WangFinal. pdf>,(2003),8 pages.
Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011),5 pages.
Davis, Ashley "A WPF Custom Control for Zooming and Panning", Retrieved from: <http://www.codeproject.com/KB/WPF/ zoomandpancontrol.aspx> on Sep. 28, 2010, (Jun. 29, 2010),21 pages.
Delimarsky, Den "Sending Tile Push Notifications on Windows Phone 7", retrieved from <http://mobile.dzone.com/articles/sending-tile-push> on May 10, 2011,(Aug. 25, 2010),2 pages.
Denoue, Laurent et al., "WebNC: Efficient Sharing of Web Applications", In *Proceedings of WWW 2009*, Available at <http://www. fxpal.com/publications/FXPAL-PR-09-495.pdf>,(2009),2 pages.
Dolcourt, Jessica "Webware", Retrieved from: http://news.cnet.com/ webware/?categoryId=2010> on May 5, 2009., 13 Pages.
Dunsmuir, Dustin "Selective Semantic Zoom of a Document Collection", Available at <http://www.cs.ubc.ca/~tmm/courses/533/ projects/dustin/proposal.pdf>,(Oct. 30, 2009),pp. 1-9.
Fisher, Bill "Cool Discussion of Push Notifications—Toast and Tile—on Windows Phone", Retrieved from: <http://www. windowsphoneexpert.com/Connection/forums/p/4153/18399.aspx> on Sep. 29, 2010, (May 3, 2010),3 pages.

Gade, Lisa "Samsung Alias u740", Retrieved from: <http://www. mobiletechreview.com/phones/Samsung-U740.htm> on Nov. 20, 2008, (Mar. 14, 2007),6 pages.
Gao, Rui "A General Logging Service for Symbian based Mobile Phones", Retrieved from: <http://www.nada.kth.se/utbildning/ grukth/exjobb/rapportlistor/2007/rapporter07/gao_rui_07132. pdf.> on Jul. 17, 2008, (Feb. 2007),pp. 1-42.
Ha, Rick et al., "SIMKEYS: An Efficient Keypad Configuration for Mobile Communications", Retrieved from: <http://ieeexplore.ieee. org/stamp/stamp.jsp?arnumber=01362557.> on Dec. 17, 2008, (Nov. 2004),7 Pages.
Harrison, Richard "Symbian OS C++ for Mobile Phones vol. 3", Retrieved from: <http:// www.amazon.co.uk/Symbian-OS-Mobile-Phones-Press/dp/productdescription/0470066415> on Oct. 23, 2008, Symbian Press,(Jun. 16, 2003),4 pages.
Hickey, Andrew R., "Google Android has Landed; T-Mobile, HTC Unveil G1", Retrieved from: <http://www.crn.com/retail/ 210603348> on Nov. 26, 2008., (Sep. 23, 2008),4 pages.
Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67. 3084&rep=rep1&type=pdf> ,(Feb. 15, 2005),pp. 1-15.
Kcholi, Avi "Windows CE .NET Interprocess Communication", Retrieved from http://msdn.microsoft.com/en-us/library/ms836784. aspx on Jul. 17, 2008., (Jan. 2004),15 Pages.
La, Nick "Parallax Gallery", Available at <http://webdesignerwall. comtutorials/parallax-gallery/comment-page-1>,(Apr. 25, 2008),16 pages.
Long, Todd "Gmail Manager 0.6", Retrieved from: <https://addons. mozilla.org/en-US/firefox/addon/1320/> on Sep. 29, 2010, (Jan. 27, 2010),4 pages.
Mann, Richard et al., "Spectrum Analysis of Motion Parallax in a 3D Cluttered Scene and Application to Egomotion", *Journal of the Optical Society of America A*, vol. 22, No. 9, Available at <http://www. cs.uwaterloo.ca/~mannr/snow/josa-mann-langer.pdf>,(Sep. 2005),pp. 1717-1731.
Mantia, Louie "Multitasking: What Does It Mean?", retrieved from <http://mantia.me/blog/multitasking/> on Sep. 23, 2011,3 pages.
Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000),5 Pages.
Marie, Angelina "MacBook Trackpad Four Fingers Swipe Left/Right to Switch Applications", *MacBook Junkie*, retrieved from <http:// www.macbookjunkie.com/macbook-trackpad-four-fingers-swipe-left-right-to-switch-applications/> on May 11, 2011,(Nov. 13, 2010),4 pages.
Mei, Tao et al., "Probabilistic Multimodality Fusion for Event Based Home Photo Clustering", Retrieved from: <http://ieeexplore.ieee. org//stamp/stamp.jsp?tp=&arnumber=04036960.>,(Dec. 26, 2006),pp. 1757-1760.
Nordgren, Peder "Development of a Touch Screen Interface for Scania Interactor", *Masters Thesis in Computing Science*, UMEA University, Available at <http://www.cs.umu.se/education/examina/ Rapporter/PederNordgren.pdf>,(Apr. 10, 2007),pp. 1-59.
Oliver, Sam "Potential iPhone Usability and Interface Improvements", <Retrieved from: <http://www.appleinsider.com/articles/08/ 09/18/potential_iphone_usability_and_interface_improvements. html> on Nov. 12, 2008, AppleInsider,(Sep. 18, 2008),4 pages.
Oryl, Michael "Review: Asus P527 Smartphone for North America", Retrieved from: <http://www.mobileburn.com/review.jsp?Id=4257> on Dec. 17, 2008., (Mar. 5, 2008),1 Page.
Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.
Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010),3 pages.
Raghaven, Gopal et al., "Model Based Estimation and Verification of Mobile Device Performance", Available at http://alumni.cs.ucsb. edu/~raimisl/emsoft04_12.pdf.,(Sep. 27-29, 2004),10 Pages.

(56) References Cited

OTHER PUBLICATIONS

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008),1 page.
Remond, Mickael "Mobile Marketing Solutions", Retrieved from: <http://www.mobilemarketingmagazine.co.uk/mobile_social_networking/> on May 5, 2009.,(Apr. 28, 2009),16 Pages.
Rice, Stephen V., et al., "A System for Searching Sound Palettes", *Proceedings of the Eleventh Biennial Symposium on Arts and Technology.*, Available at <http://www.comparisonics.com/FindSoundsPalettePaper.pdf>,(Feb. 2008),6 pages.
Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010),2 pages.
Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009),7 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.
Sandoval, Guillermo L., "A development platform and execution environment for mobile applications", *Universidad Autónoma de Baja California, School of Chemical Sciences and Engineering*, Available at <http://citeseerx.ist.psu.edu/viewdoc/download-?doi=10.1.1.86.7989&rep=rep1&type=pdf> ,(2004),18 pages.
Singh, Kundan et al., "Cinema: Columbia InterNet Extensible Multimedia Architecture", Available at <http://www1.cs.columbia.edu/~library/TR-repository/reports/reports-2002/cucs-011-02.pdf>,(Sep. 3, 2002),83 Pages.
Smith, Greg et al., "GroupBar: The TaskBar Evovled", *Proceedings of OZCHI 2003*, Available at <http://research.microsoft.com/pubs/64316/ozchi2003-groupbar.pdf>,(Nov. 2003),pp. 1-10.
Steinicke, Frank et al., "Multi-Touching 3D Data: Towards Direct Interaction in Stereoscopic Display Enviroments coupled with Mobile Devices", *Advanced Visual Interfaces (AVI) Workshops on Designing Multi-Touch Interaction Techniques for Coupled Public* Available at <http://viscg.uni-muenster.de/publications/2008/SHSK08/ppd-workshop.-pdf.>,(Jun. 15, 2008),4 Pages.
Suror, "PocketShield—New Screenlock App for the HTC Diamond and Pro", Retrieved from: <http://wmpoweruser.com/?tag=htc-touch-diamond> on Jun. 28, 2011, (Oct. 23, 2008),2 pages.
Terpstra, Brett "Beta Beat: Grape, a New Way to Manage Your Desktop Clutter", Retrieved from: Beta Beat: Grape, a New Way to Manage Your Destop Clutter on Jun. 28, 2011, (Apr. 14, 2009),4 pages.
Vallerio, Keith S., et al., "Energy-Efficient Graphical User Interface Design", Retrieved from: <http://www.cc.gatech.edu/classes/AY2007/cs7470_fall/zhonq-energy-efficient-user-interface.pdf>, (Jun. 10, 2004),pp. 1-13.
Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011),4 pages.
Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011),6 pages.
Vonberger, Jan "Bluetile", Retrieved from: <http://www.bluetile.org> on Sep. 29, 2010, 5 pages.
Wilson, Andrew D., "Robust Computer Vision-Based Detection of Pinching for One and Two-Handed Gesture Input", In *Proceedings of UIST 2006*, Available at http://research.microsoft.com/en-us/um/people/awilson/publications/wilsonuist2006/uist%202006%20taffi.pdf>,(Oct. 2006),4 pages.
Wilson, Tracy V., "How the iPhone Works", Retrieved from: <http://electronics.howstuffworks.com/iphone2.htm> on Apr. 24, 2009, (Jan. 2007),9 pages.
Wobbrock, Jacob O., et al., "User-defined Gestures for Surface Computing", *CHI 2009*, Apr. 4-9, 2009, Boston MA, available at <http://faculty.washington.edu/wobbrock/pubs/chi-09.2.pdf>,(Apr. 4, 2009),10 pages.
Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008),25 pages.
Wyatt, Paul "/Flash/the art of parallax scrolling", .net Magazine,(Aug. 1, 2007),pp. 74-76.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.
"Final Office Action", U.S. Appl. No. 12/721,422, (Mar. 7, 2013),10 pages.
"Final Office Action", U.S. Appl. No. 13/118,339, (Aug. 22, 2013), 21 pages.
"Final Office Action", U.S. Appl. No. 13/118,347, (Aug. 15, 2013), 25 pages.
"Non-Final Office Action", U.S. Appl. No. 12/721,422, (Oct. 1, 2012), 7 pages.
"Notice of Allowance", U.S. Appl. No. 12/721,422, (Jul. 11, 2013), 9 pages.
"You've Got Mail 1.4 Build", retrieved from <http://www.fileshome.com/Shows_Animation_Plays_Sounds_Automatic_N . . . > Jan. 6, 2010, (Jun. 18, 2007), 2 pages.
Farrugia, Michael et al., "Cell Phone Mini Challenge: Node-Link Animation Award Animating Multivariate Dynamic Social Networks", *IEEE Symposium on Visual Analytics Science and Technology*, Columbus OH, USA, Oct. 21-23, 2008, (Oct. 21, 2008), 2 pages.
Keranen, Jaakko "OpenGL-based User Interface Toolkit for Symbian Mobile Devices", *Master of Science Thesis*, Tamere Universtiy of Technology, Department of Information Technology, (Apr. 6, 2005), 88 pages.
"Final Office Action", U.S Appl. No. 13/657,646, (May 6, 2013),12 pages.
"Non-Final Office Action", U.S. Appl. No. 13/118,181, (Mar. 4, 2013), 22 pages.
"Non-Final Office Action", U.S. Appl. No. 13/118,204, (Feb. 28, 2013),13 pages.
"Non-Final Office Action", U.S. Appl. No. 13/118,221, (Mar. 1, 2013), 22 pages.
"Non-Final Office Action", U.S. Appl. No. 13/118,257, (Mar. 5, 2013),19 pages.
"Non-Final Office Action", U.S. Appl. No. 13/118,321, (Jun. 10, 2013), 32 pages.
"Non-Final Office Action", U.S. Appl. No. 13/118,333, (Jul. 5, 2013),18 pages.
"Notice of Allowance", U.S. Appl. No. 12/977,584, (Jun. 19, 2013), 5 pages.
Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.
Kurdi, Samer "WinSplit Revolution", Retrieved from <http://www.freewaregenius.com/winsplit-revolution/> on Jun. 30, 2013, (Aug. 22, 2007), 4 Pages.
"Final Office Action", U.S. Appl. No. 13/118,204, (Nov. 21, 2013), 24 pages.
"Final Office Action", U.S. Appl. No. 13/224,258, (Sep. 11, 2013), 37 pages.
"Final Office Action", U.S. Appl. No. 13/657,621, (Sep. 10, 2013),18 pages.
"Non-Final Office Action", U.S. Appl. No. 13/229,155, (Nov. 18, 2013),14 pages.

(56) References Cited

OTHER PUBLICATIONS

"Supplemental Notice of Allowance", U.S. Appl. No. 12/977,584, (Sep. 16, 2013),2 pages.
"Supplemental Notice of Allowance", U.S. Appl. No. 12/977,584, (Oct. 11, 2013),2 pages.
"Final Office Action", U.S. Appl. No. 13/118,181, Dec. 20, 2013, 18 pages.
"Final Office Action", U.S. Appl. No. 13/118,221, Mar. 17, 2014, 21 pages.
"Final Office Action", U.S. Appl. No. 13/118,321, Dec. 19, 2013, 30 pages.
"Final Office Action", U.S. Appl. No. 13/118,333, Apr. 23, 2014, 22 pages.
"Final Office Action", U.S. Appl. No. 13/229,155, Jun. 12, 2014, 15 pages.
"Foreign Office Action", CN Application No. 201110437572.2, Dec. 3, 2013, 7 pages.
"Non-Final Office Action", U.S. Appl. No. 13/118,292, Jun. 6, 2014, 25 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/229,709, Apr. 7, 2014, 12 pages.
"Restriction Requirement", U.S. Appl. No. 13/118,288, Mar. 4, 2014, 7 pages.
"Extended European Search Report", EP Application No. 11866553.8, Dec. 9, 2014, 7 pages.
"Extended European Search Report", EP Application No. 11866579.3, Oct. 9, 2014, 7 pages.
"Extended European Search Report", EP Application No. 11867033.0, Nov. 27, 2014, 8 pages.
"Final Office Action", U.S. Appl. No. 13/118,288, Nov. 7, 2014, 14 pages.
"Final Office Action", U.S. Appl. No. 13/118,292, Dec. 5, 2014, 30 pages.
"Final Office Action", U.S. Appl. No. 13/118,302, Aug. 15, 2014, 17 pages.
"Final Office Action", U.S. Appl. No. 13/118,314, Sep. 11, 2014, 18 pages.
"Final Office Action", U.S. Appl. No. 13/224,258, Jul. 18, 2014, 39 pages.
"Final Office Action", U.S. Appl. No. 13/229,702, Jan. 15, 2015, 24 pages.
"Final Office Action", U.S. Appl. No. 13/345,383, Jul. 25, 2014, 26 pages.
"Final Office Action", U.S. Appl. No. 13/657,621, Jan. 15, 2015, 22 pages.
"First Examination Report", NZ Application No. 618254, May 20, 2014, 3 Pages.
"First Examination Report", NZ Application No. 618264, May 20, 2014, 2 pages.
"First Examination Report", NZ Application No. 618269, May 20, 2014, 2 pages.
"First Examination Report", NZ Application No. 618284, May 20, 2014, 2 pages.
"Foreign Notice of Acceptance", NZ Application No. 618269, Oct. 31, 2014, 1 Page.
"Foreign Office Action", CN Application No. 201180071186.4, Jun. 13, 2014, 12 pages.
"Foreign Office Action", CN Application No. 201180071195.3, Aug. 25, 2014, 15 pages.
"Foreign Office Action", CN Application No. 201180071196.8, Sep. 11, 2014, 13 pages.
"Foreign Office Action", CN Application No. 201180071200.0, Aug. 19, 2014, 15 pages.
"Foreign Office Action", CN Application No. 201210317470.1, Jun. 5, 2014, 12 pages.
"Foreign Office Action", CN Application No. 201210331158.8, Sep. 3, 2014, 16 Pages.
"Foreign Office Action", CN Application No. 201210331686.3, Jun. 13, 2014, 13 pages.
"Foreign Office Action", CO Application No. 13-298.756, Sep. 18, 2014, 13 Pages.
"Foreign Office Action", CO Application No. 13300256, Sep. 24, 2014, 8 Pages.
"Foreign Office Action", CO Application No. 13300259, Sep. 24, 2014, 15 Pages.
"Foreign Office Action", CO Application No. 13300265, Sep. 24, 2014, 10 Pages.
"Further Examination Report", NZ Application No. 618264, Dec. 3, 2014, 3 Pages.
"Non-Final Office Action", U.S. Appl. No. 13/118,288, Jul. 2, 2014, 17 pages.
"Non-Final Office Action", U.S. Appl. No. 13/118,321, Nov. 12, 2014, 33 pages.
"Non-Final Office Action", U.S. Appl. No. 13/118,339, Dec. 10, 2014, 16 pages.
"Non-Final Office Action", U.S. Appl. No. 13/118,347, Dec. 3, 2014, 28 pages.
"Non-Final Office Action", U.S. Appl. No. 13/229,155, Jan. 7, 2015, 14 pages.
"Non-Final Office Action", U.S. Appl. No. 13/229,702, Jul. 3, 2014, 28 pages.
"Non-Final Office Action", U.S. Appl. No. 13/657,621, Jul. 18, 2014, 22 pages.
"Non-Final Office Action", U.S. Appl. No. 13/657,646, Aug. 12, 2014, 14 pages.
"Non-Final Office Action", U.S. Appl. No. 14/089,149, Nov. 3, 2014, 8 pages.
"Notice of Allowance", U.S. Appl. No. 13/118,204, Jul. 8, 2014, 8 pages.
"Notice of Allowance", U.S. Appl. No. 13/229,709, Sep. 2, 2014, 4 pages.
"Notice of Allowance", U.S. Appl. No. 14/089,149, Dec. 5, 2014, 4 pages.
"Supplemental Notice of Allowance", U.S. Appl. No. 13/118,204, Sep. 10, 2014, 2 pages.
"Supplemental Notice of Allowance", U.S. Appl. No. 13/118,204, Oct. 2, 2014, 2 pages.
"Supplemental Notice of Allowance", U.S. Appl. No. 13/118,204, Oct. 23, 2014, 3 pages.
Camick, "Wrap Layout", Java Tips Weblog, retrieved from <https://tips4java.wordpress.com/2008/11/06/wrap-layout/> on Jan. 11, 2015, Nov. 6, 2008, 28 pages.
Webmonkey "HTML Cheatsheet", Retrieved From: <http://www.webmonkey.com/2010/02/html_cheatsheet> on Nov. 7, 2014, Feb. 15, 2010, 5 pages.
"Foreign Notice of Allowance", CN Application No. 201210331158.8, Sep. 8, 2015, 3 Pages.
"Foreign Office Action", EP Application No. 11866579.3, Sep. 3, 2015, 4 pages.
"Foreign Office Action", JP Application No. 2014-512819, Sep. 29, 2015, 4 pages.
"Foreign Office Action", JP Application No. 2014-529672, Oct. 6, 2015, 7 pages.
"Non-Final Office Action", U.S. Appl. No. 13/118,181, Oct. 23, 2015, 15 pages.
"Non-Final Office Action", U.S. Appl. No. 13/118,221, Oct. 7, 2015, 8 pages.
"Corrected Notice of Allowance", U.S. Appl. No. 14/659,442, Nov. 10, 2015, 2 pages.
"Corrected Notice of Allowance", U.S. Appl. No. 14/659,442, Nov. 27, 2015, 2 pages.
"Extended European Search Report", Application No. 11871739.6, Oct. 5, 2015, 13 pages.
"Extended European Search Report", EP Application No. 11872164.6, Sep. 18, 2015, 8 pages.
"Final Office Action", U.S. Appl. No. 14/159,163, Dec. 3, 2015, 6 pages.

(56) References Cited

OTHER PUBLICATIONS

"Foreign Office Action", CL Application No. 3369-13, Oct. 29, 2015, 6 pages.
"Foreign Office Action", CL Application No. 3370-2013, Oct. 29, 2015, 6 pages.
"Foreign Office Action", Co Application No. 13-298.756, Oct. 11, 2015, 11 pages.
"Foreign Office Action", JP Application No. 2014-512820, Sep. 29, 2015, 10 pages.
"Foreign Office Action", JP Application No. 2014-512821, Oct. 20, 2015, 5 pages.
"Foreign Office Action", JP Application No. 2014-512824, Nov. 6, 2015, 5 pages.
"Foreign Office Action", JP Application No. 2014-528371, Sep. 29, 2015, 16 pages.
"Foreign Office Action", JP Application No. 2014-529671, Sep. 29, 2015, 16 pages.
"Foreign Office Action", RU Application No. 2013152630, Oct. 26, 2015, 5 pages.
"Foreign Office Action", RU Application No. 2013152634, Oct. 22, 2015, 7 pages.
"Foreign Office Action", RU Application No. 2013152635, Oct. 28, 2015, 7 pages.
"Foreign Office Action", RU Application No. 2013152636, Oct. 16, 2015, 11 pages.
"Foreign Office Action", RU Application No. 2014107906, Oct. 6, 2015, 6 pages.
"Foreign Office Action", RU Application No. 2014108874, Oct. 6, 2015, 6 pages.
"Introduction to Windows 7", https://www.google.com/url?q=http://www.wright.edu/sites/default/files/page/attachements/windows7.pdf, Jul. 1, 2010, 13 pages.
"Non-Final Office Action", U.S. Appl. No. 13/118,302, Nov. 6, 2015, 21 pages.
"Samsung Galaxy 2 TouchWiz 4.0 Tour (Homescreen, Settings, etc)", https://www.youtube.com/watch?v=oXBbiy0Adiw, May 9, 2011, 3 pages.
D,"Android Apps in Depth—02—Go Launcher EX", https://www.youtube.com/watch?v=u5LISE8BU_E, Mar. 6, 2011, 3 pages.
D,"Android HTC EVO 4G Tutorials 01—Getting Started, Home Screens", https://www.youtube.com/watch?v=fwvt-rsCMA8, Feb. 3, 2011, 3 pages.
Demers,"In Depth: GO Launcher EX—Droid Life", http://www.droid-life.com/2011/01/26/in-depth-go-launcher-ex/, Jan. 26, 2011, 8 pages.
Takahiro,"Let's Manage the Installed Applications", In Easy to Use Mini, Exhaustion Utilization of iPhone,vol. 1, p. 25 Memo, Mar. 10, 2011, 6 pages.
"Corrected Notice of Allowance", U.S. Appl. No. 14/089,149, Feb. 20, 2015, 2 pages.
"Extended European Search Report", EP Application No. 11866699.9, Jan. 15, 2015, 6 pages.
"Extended European Search Report", EP Application No. 11866745.0, Jan. 21, 2015, 10 pages.
"Extended European Search Report", EP Application No. 11866772.4, Jan. 15, 2015, 6 pages.
"Extended European Search Report", EP Application No. 11866939.9, Jan. 15, 2015, 8 pages.
"Extended European Search Report", EP Application No. 11867076.9, Jan. 15, 2015, 8 pages.
"Final Office Action", U.S. Appl. No. 13/118,321, Apr. 2, 2015, 30 pages.
"Foreign Notice of Acceptance", NZ Application No. 618254, Jan. 20, 2015, 1 Page.
"Foreign Notice of Allowance", CN Application No. 201110437572.2, Mar. 3, 2015, 3 Pages.
"Foreign Office Action", CN Application No. 201180071186.4, Jan. 20, 2015, 8 pages.
"Foreign Office Action", CN Application No. 201180071195.3, Mar. 18, 2015, 8 pages.
"Foreign Office Action", CN Application No. 201180071200.0, Feb. 17, 2015, 12 pages.
"Foreign Office Action", CN Application No. 201210331686.3, Mar. 3, 2015, 14 pages.
"Non-Final Office Action", U.S. Appl. No. 13/345,383, Jan. 29, 2015, 5 pages.
"Notice of Allowance", U.S. Appl. No. 13/118,339, Mar. 31, 2015, 7 pages.
"Notice of Allowance", U.S. Appl. No. 13/118,347, Apr. 1, 2015, 7 pages.
"Notice of Allowance", U.S. Appl. No. 13/657,646, Feb. 6, 2015, 15 pages.
"Supplemental Notice of Allowance", U.S. Appl. No. 14/089,149, Mar. 20, 2015, 2 pages.
"Corrected Notice of Allowance", U.S. Appl. No. 13/118,333, Jun. 1, 2015, 4 pages.
"Extended European Search Report", EP Application No. 11872137.2, Apr. 9, 2015, 12 pages.
"Final Office Action", U.S. Appl. No. 13/229,155, Jun. 4, 2015, 16 pages.
"Foreign Office Action", CL Application No. 3368-2013, May 7, 2015, 7 pages.
"Foreign Office Action", CL Application No. 3369-2013, May 7, 2015, 6 pages.
"Foreign Office Action", CL Application No. 3370-2013, May 7, 2015, 6 pages.
"Foreign Office Action", CN Application No. 201180071186.4, Jun. 2, 2015, 7 pages.
"Foreign Office Action", CN Application No. 201210331158.8, May 11, 2015, 7 pages.
"Foreign Office Action", CO Application No. 13300256, Apr. 11, 2015, 8 Pages.
"Foreign Office Action", CO Application No. 13300265, Apr. 21, 2015, 11 pages.
"Foreign Office Action", PH Application No. PH/1/2013/502367, Apr. 24, 2015, 3 pages.
"Non-Final Office Action", U.S. Appl. No. 13/118,314, Jun. 19, 2015, 23 pages.
"Notice of Allowance", U.S. Appl. No. 13/118,333, May 4, 2015, 16 pages.
"Notice of Allowance", U.S. Appl. No. 13/229,702, Apr. 29, 2015, 7 pages.
"Notice of Allowance", U.S. Appl. No. 13/345,383, May 18, 2015, 5 pages.
"Corrected Notice of Allowance", U.S. Appl. No. 13/118,333, Aug. 4, 2015, 4 pages.
"Corrected Notice of Allowance", U.S. Appl. No. 13/118,333, Sep. 14, 2015, 4 pages.
"Final Office Action", U.S. Appl. No. 13/224,258, Aug. 13, 2015, 39 pages.
"Foreign Notice of Acceptance", NZ Application No. 618264, Jun. 27, 2015, 1 Page.
"Foreign Office Action", CN Application No. 201210331686.3, Sep. 1, 2015, 11 pages.
"Further Examination Report", NZ Application No. 618284, Jul. 13, 2015, 2 pages.
"Non-Final Office Action", U.S. Appl. No. 13/118,288, Aug. 24, 2015, 19 pages.
"Non-Final Office Action", U.S. Appl. No. 13/118,321, Sep. 8, 2015, 34 pages.
"Non-Final Office Action", U.S. Appl. No. 14/059,163, Aug. 10, 2015, 5 pages.
"Non-Final Office Action", U.S. Appl. No. 14/659,442, Jul. 7, 2015, 7 pages.
"Notice of Allowance", U.S. Appl. No. 14/659,442, Aug. 19, 2015, 4 pages.
"Final Office Action", U.S. Appl. No. 13/118,314, Jan. 13, 2016, 16 pages.
"Final Office Action", U.S. Appl. No. 13/657,621, Jan. 21, 2016, 21 pages.

(56) References Cited

OTHER PUBLICATIONS

"Final Office Action", U.S. Appl. No. 14/059,163, Dec. 3, 2015, 6 pages.
"Foreign Office Action", CN Application No. 201180071194.9, Nov. 27, 2015, 17 pages.
"Foreign Office Action", EP Application No. 11866772.4, Feb. 2, 2016, 5 pages.
"Foreign Office Action", EP Application No. 1866699.9, Feb. 3, 2016, 4 pages.
"Foreign Office Action", PH Application No. 1-2013-502364, Jan. 19, 2016, 4 pages.

* cited by examiner

SWITCHING BACK TO A PREVIOUSLY-INTERACTED-WITH APPLICATION

RELATED APPLICATION

This application is a continuation of and claims priority under 35 U.S.C. §120 to U.S. patent application Ser. No. 13/118,302, filed on May 27, 2011, the disclosure of which is incorporated by reference herein in its entirety.

BACKGROUND

Conventional techniques for selecting a previously-interacted-with application that is not currently exposed on a display are often confusing, take up valuable display space, cannot be universally applied across different devices, or provide a poor user experience.

Some conventional techniques, for example, enable selection of a previously-interacted-with application through onscreen controls in a task bar, within a floating window, or on a window frame. These onscreen controls, however, take up valuable display real estate and can annoy users by requiring users to find and select the correct control.

Some other conventional techniques enable selection of a previously-interacted-with application through hardware, such as hot keys and buttons. At best these techniques require users to remember what key, key combination, or hardware button to select. Even in the best case users often accidentally select keys or buttons. Further, in many cases hardware-selection techniques cannot be universally applied, as hardware on computing devices can vary by device model, generation, vendor, or manufacturer. In such cases, either the techniques will not work or work differently across different computing devices. This exacerbates the problem of users needing to remember the correct hardware, as many users have multiple devices, and so may need to remember different hardware selections for different devices. Further still, for many computing devices hardware selection forces users to engage a computing device outside the user's normal flow of interaction, such as when a touch-screen device requires a user to change his or her mental and physical orientation from display-based interactions to hardware-based interactions.

Still another conventional technique enables users to select a previously-interacted-with application by selecting to enter an application-selecting mode, search through various gesture-based controls, select the control, and then select to interact with the selected application's user interface once it is presented. As is readily apparent, this technique requires numerous user actions and can provide a poor user experience.

SUMMARY

This document describes techniques and apparatuses for switching back to a previously-interacted-with application. In some embodiments, these techniques and apparatuses enable selection of a user interface not currently exposed on a display through a simple gesture that is both easy-to-use and remember.

This summary is provided to introduce simplified concepts for switching back to a previously-interacted-with application that are further described below in the Detailed Description. This summary is not intended to identify essential features of the claimed subject matter, nor is it intended for use in determining the scope of the claimed subject matter. Techniques and/or apparatuses for switching back to a previously-interacted-with application are also referred to herein separately or in conjunction as the "techniques" as permitted by the context.

BRIEF DESCRIPTION OF THE DRAWINGS

Embodiments for switching back to a previously-interacted-with application are described with reference to the following drawings. The same numbers are used throughout the drawings to reference like features and components.

DETAILED DESCRIPTION

Overview

This document describes techniques and apparatuses for switching back to a previously-interacted-with application. These techniques, in some embodiments, enable a user to quickly and easily select prior applications.

Consider a case where a user visits a shopping website, then interacts with a local word-processing document, then visits the shopping website again, then visits a social-networking website, and then visits a web-enabled radio website. Assume that the user, when listening to songs on the radio website, decides to revisit the shopping website. The described techniques and apparatuses enable her to do so quickly and easily with two or even one input. She may simply swipe at an edge of her display to quickly see the social-networking website and then swipe again to revisit the shipping website. The techniques in this example permit the user to revisit prior applications based on which were most-recently interacted with rather than when opened, without taking up valuable display real estate with onscreen controls, and without requiring the user to find or remember a hardware button. Further still, no gesture, other than one starting from an edge, is used by the techniques in this example, thereby permitting applications to use nearly all commonly-available gestures.

This is but one example of many ways in which the techniques enabling switching back to a previously-interacted-with applications, others of which are described below.

EXAMPLE SYSTEM

Figure 1:
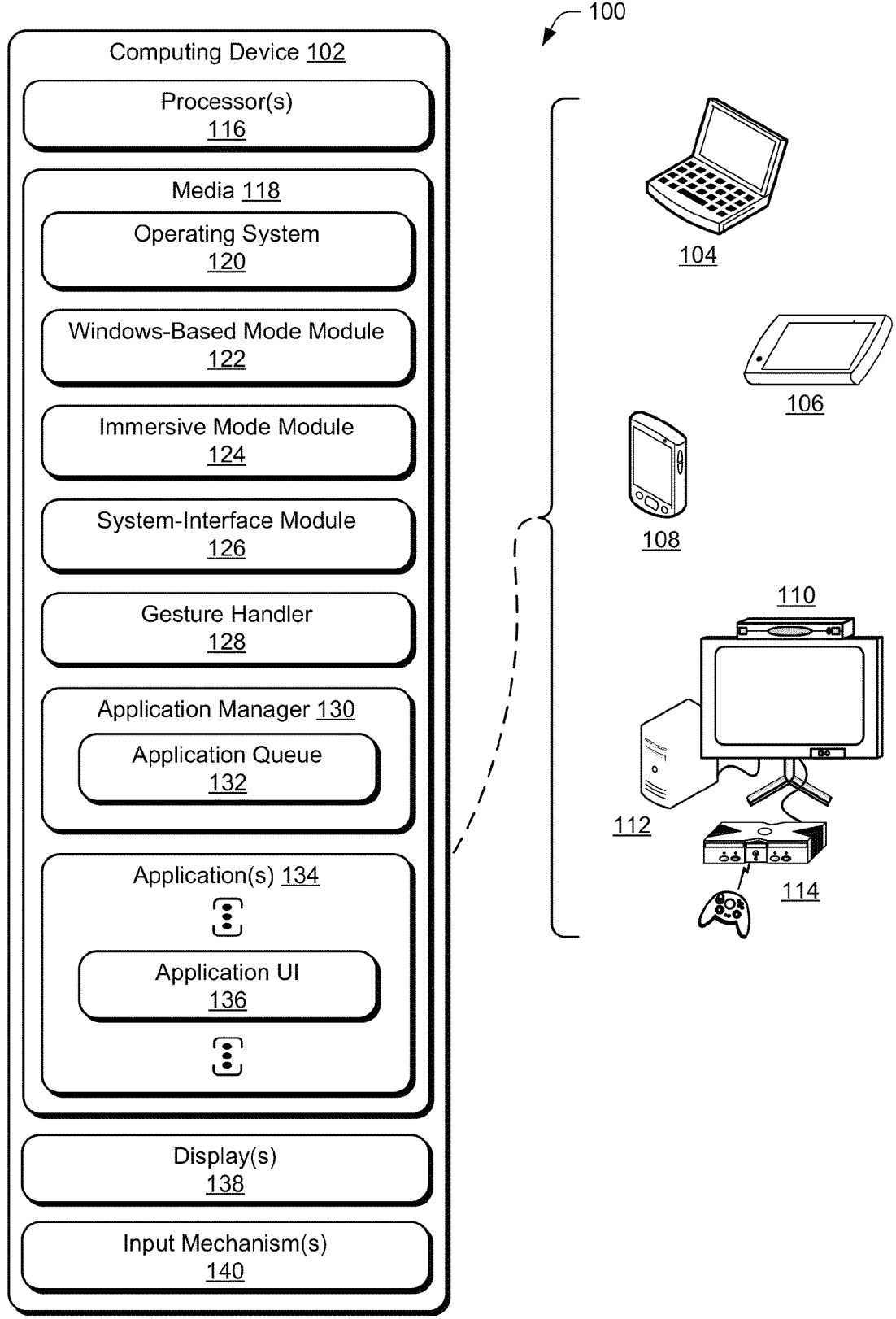
FIG. 1 illustrates an example system in which techniques for switching back to a previously-interacted-with application can be implemented.

FIG. 1 illustrates an example system 100 in which techniques for switching back to a previously-interacted-with application can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, windows-based mode module 122, immersive mode module 124, system-interface module 126, gesture handler 128, application manager 130, which includes or has access to application queue 132, and one or more applications 134, each having one or more application user interfaces 136.

Computing device 102 also includes or has access to one or more displays 138 and input mechanisms 140. Four example displays are illustrated in FIG. 1. Input mechanisms 140 may include gesture-sensitive sensors and devices, such as touch-based sensors and movement-tracking sensors (e.g., camera-based), as well as mice (free-standing or integral with a keyboard), track pads, and microphones with accompanying voice recognition software, to name a few. Input mechanisms 140 may be separate or integral with displays 138; integral examples include gesture-sensitive displays with integrated touch-sensitive or motion-sensitive sensors.

Windows-based mode module 122 presents application user interfaces 136 through windows having frames. These frames may provide controls through which to interact with an application and/or controls enabling a user to move and resize the window.

Immersive mode module 124 provides an environment by which a user may view and interact with one or more of applications 134 through application user interfaces 136. In some embodiments, this environment presents content of, and enables interaction with, applications with little or no window frame and/or without a need for a user to manage a window frame's layout or primacy relative to other windows (e.g., which window is active or up front) or manually size or position application user interfaces 136.

This environment can be, but is not required to be, hosted and/or surfaced without use of a windows-based desktop environment. Thus, in some cases immersive mode module 124 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. While not required, in some cases this immersive environment enables use of all or nearly all of the pixels of a display by applications. Examples of immersive environments are provided below as part of describing the techniques, though they are not exhaustive or intended to limit the techniques described herein.

System-interface module 126 provides one or more interfaces through which interaction with operating system 120 is enabled, such as an application-launching interface, a start menu, or a system tools or options menu, to name just a few.

Operating system 120, modules 122, 124, and 126, as well as gesture handler 128 and application manager 130 can be separate from each other or combined or integrated in any suitable form.

EXAMPLE METHODS

Example methods 200, 800, and 900 address edge gestures and are described prior to methods 1400 and 1700, which address switching back to a previously-interacted-with application. Any one or more of methods 200, 800, and 900 may be used separately or in combination with, in whole or in part, methods 1400 and/or 1700. An edge gesture may be used to select to switch back to a prior application as but one example of ways in which the various methods can be combined or act complimentary, though use of the edge gesture is not required by methods 1400 and/or 1700.

Figure 2:
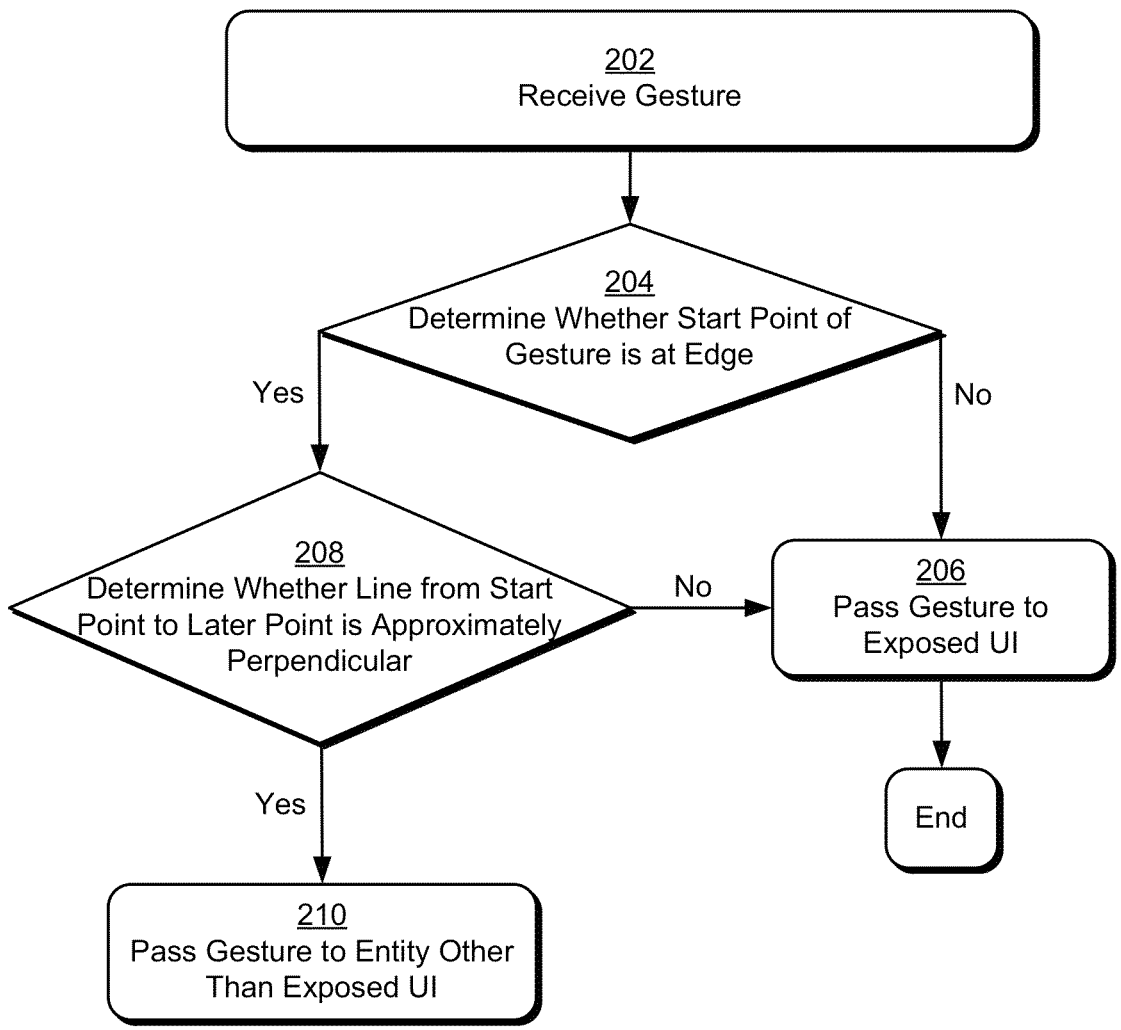
FIG. 2 illustrates an example method for enabling edge gestures that can be used to select to switch back to a previously-interacted-with application, the edge gestures being approximately perpendicular to an edge in which the gesture begins.

FIG. 2 depicts a method 200 for enabling edge gestures based on the edge gesture being approximately perpendicular to an edge in which the gesture begins. In portions of the following discussion reference may be made to system 100 of FIG. 1, reference to which is made for example only.

Block 202 receives a gesture. This gesture may be received at various parts of a display, such as over a windows-based interface, an immersive interface, or no interface. Further, this gesture may be made and received in various manners, such as a pointer tracking a movement received through a touch pad, mouse, or roller ball or a physical movement made with arm(s), finger(s), or a stylus received through a motion-sensitive or touch-sensitive mechanism.

Figure 3:
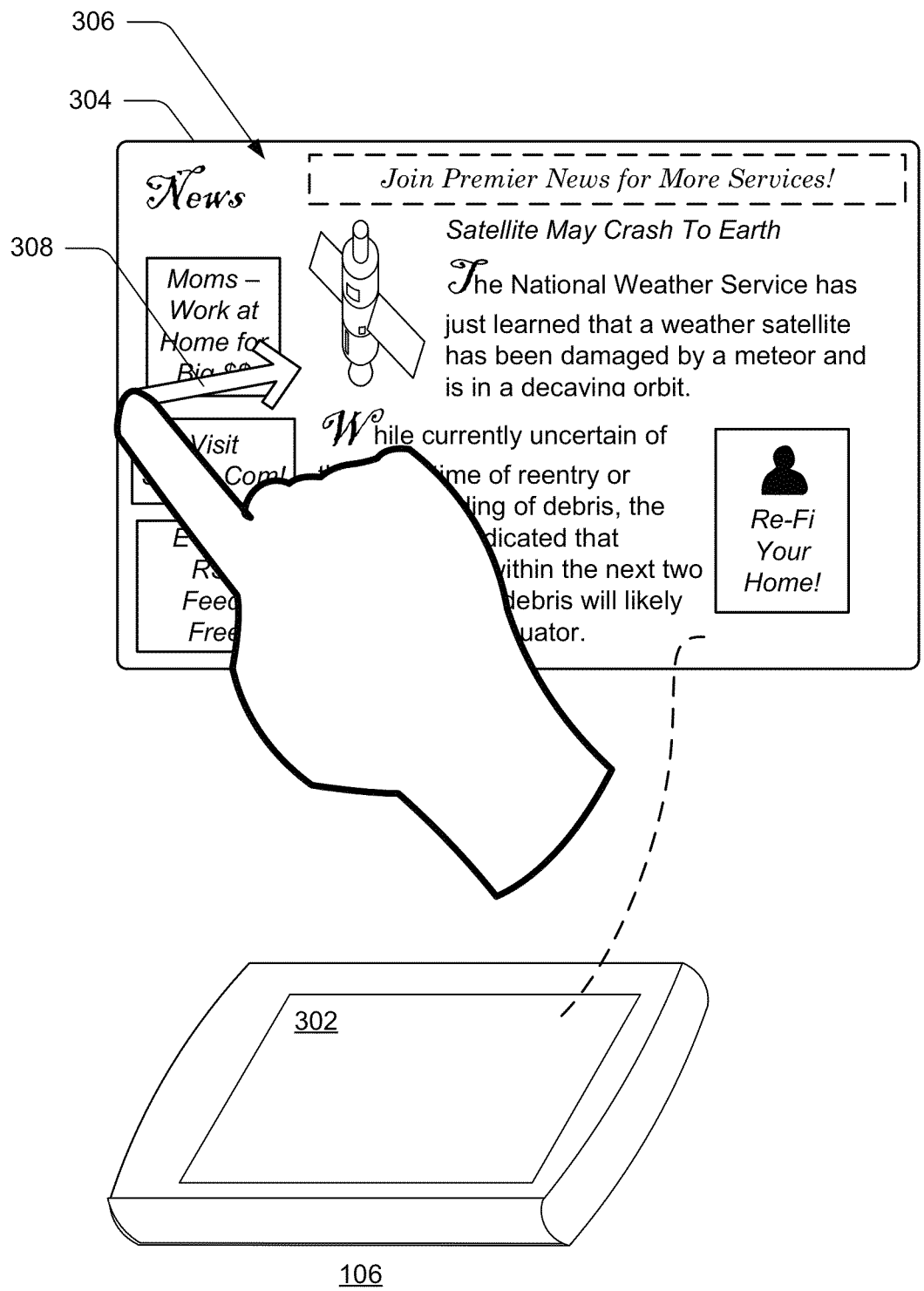
FIG. 3 illustrates an example tablet computing device having a touch-sensitive display presenting an immersive interface.

By way of example consider FIG. 3, which illustrates a tablet computing device 106. Tablet 106 includes a touch-sensitive display 302 shown displaying an immersive interface 304 that includes a webpage 306. As part of an ongoing example, at block 202 gesture handler 128 receives gesture 308 as shown in FIG. 3.

Block 204 determines whether a start point of the gesture is at an edge. As noted above, the edge in question can be an edge of a user interface, whether immersive or windows-based, and/or of a display. In some cases, of course, an edge of a user interface is also an edge of a display. The size of the edge can vary based on various factors about the display or interface. A small display or interface may have a smaller size in absolute or pixel terms than a large display or interface. A highly sensitive input mechanism permits a smaller edge as well. Example edges are rectangular and vary between one and twenty pixels in one dimension and an interface limit of the interface or display in the other dimension, though other sizes and shapes, including convex and concave edges may instead be used.

Figure 4:
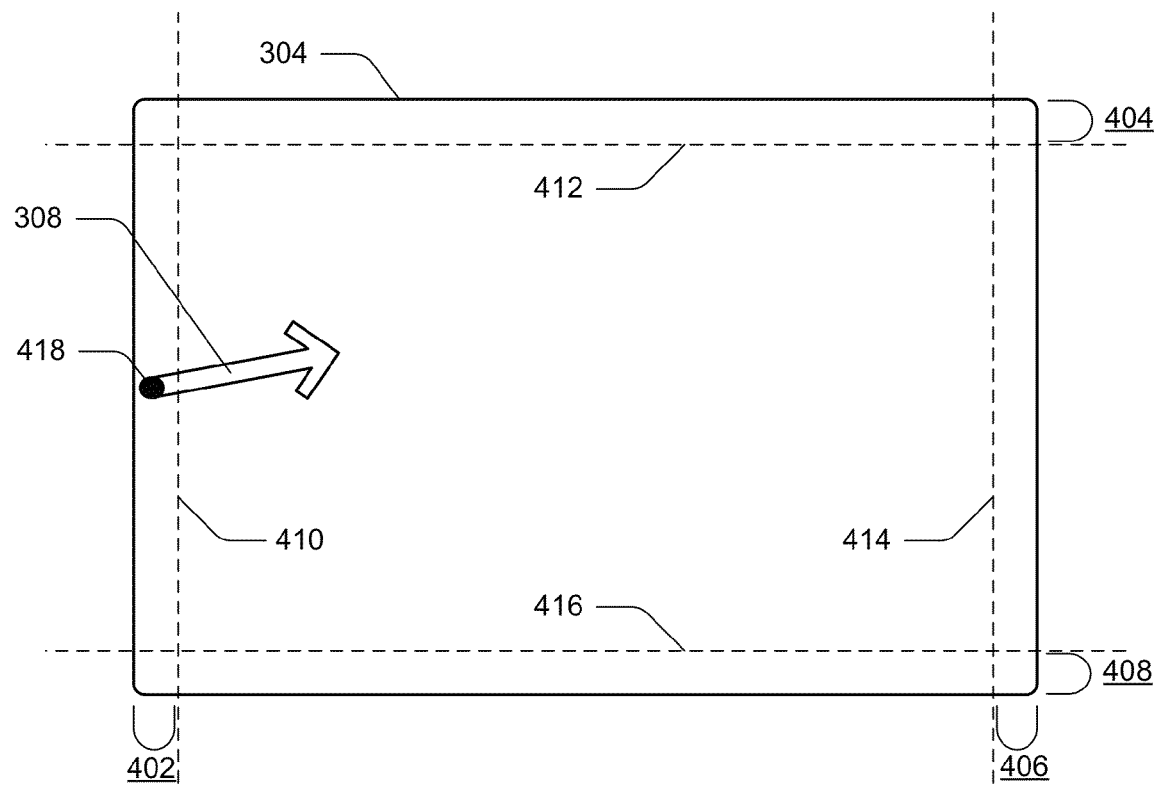
FIG. 4 illustrates the example immersive interface of FIG. 3 along with example edges.

Continuing the ongoing example, consider FIG. 4, which illustrates immersive interface 304 and gesture 308 of FIG. 3 as well as left edge 402, top edge 404, right edge 406, and bottom edge 408. For visual clarity webpage 306 is not shown. In this example the dimensions of the interface and display are of a moderate size, between that of smart phones and that of many laptop and desktop displays. Edges 402, 404, 406, and 408 have a small dimension of twenty pixels, an area of each shown bounded by dashed lines at twenty pixels from the display or interface limit at edge limit 410, 412, 414, and 416, respectively.

Gesture handler 128 determines that gesture 308 has a start point 418 and that this start point 418 is within left edge 402. Gesture handler 128 determines the start point in this case by receiving data indicating [X,Y] coordinates in pixels at which gesture 308 begins and comparing the first of these coordinates to those pixels contained within each edge 402-408. Gesture handler 128 often can determine the start point and whether it is in an edge faster than a sample rate, thereby causing little or no performance downgrade from techniques that simply pass gestures directly to an exposed interface over which a gesture is made.

Returning to method 200 generally, if block 204 determines that the start point of the gesture is not at an edge, method 200 proceeds along a "No" path to block 206. Block 206 passes the gestures to an exposed user interface, such as an underlying interface over which the gesture was received. Altering the ongoing example, assume that gesture 308 was determined not to have a start point within an edge. In such a case gesture handler 128 passes buffered data for gesture 308 to immersive user interface 304. After passing the gesture, method 200 ends.

If block 204 determines that the start point of the gesture is in an edge, method 200 proceeds along a "Yes" path to block 208. Block 208 responds to the positive determination of block 204 by determining whether a line from the start point to a later point of the gesture is approximately perpendicular from the edge.

Block 208, in some embodiments, determines the later point used. Gesture handler 128, for example, can determine the later point of the gesture based on the later point being received a preset distance from the edge or the start point, such as past edge limit 410 for edge 402 or twenty pixels from start point 418, all of FIG. 4. In some other embodiments, gesture handler 128 determines the later point based on it being received a preset time after receipt of the start point, such an amount of time slightly greater than used generally by computing device 102 to determine that a gesture is a tap-and-hold or hover gesture.

For the ongoing embodiment, gesture handler 128 uses a later-received point of gesture 308 received outside of edge 402 so long as that later-received point is received within a preset time. If no point is received outside of the edge within that preset time, gesture handler 128 proceeds to block 206 and passes gesture 308 to immersive interface 304.

Using the start point, block 208 determines whether a line from the start point to the later point of the gesture is approximately perpendicular to the edge. Various angles of variance can be used in this determination by block 208, such as five, ten, twenty, or thirty degrees.

Figure 5:
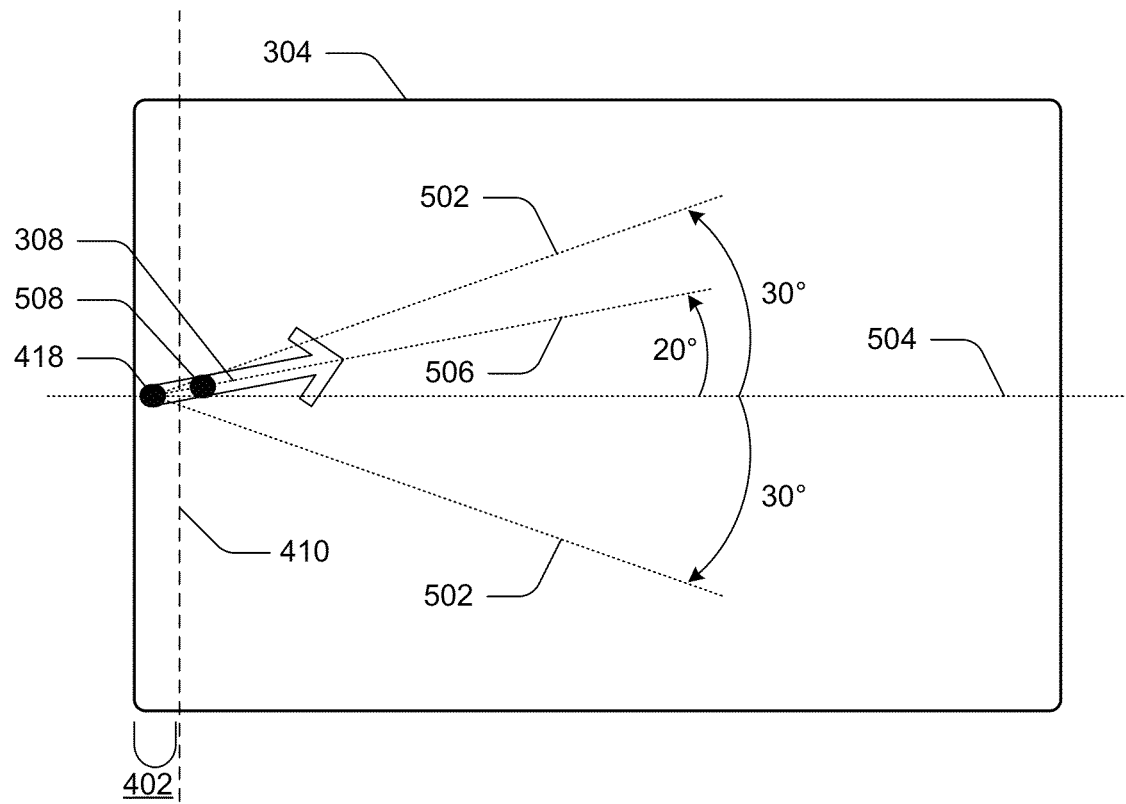
FIG. 5 illustrates the example immersive interface of FIGS. 3 and 4 along with angular variance lines from a perpendicular line and a line from a start point to a later point of a gesture.

By way of example, consider an angle of variance of thirty degrees from perpendicular. FIG. 5 illustrates this example variance, showing immersive interface 304, gesture 308, left edge 402, left edge limit 410, and start point 418 of FIGS. 3 and 4 along with a thirty-degree variance lines 502 from perpendicular line 504. Thus, gesture handler 128 determines that line 506 from start point 418 to later point 508 (which is at about twenty degrees from perpendicular) is approximately perpendicular based on being within the example thirty-degree variance line 502.

Generally, if block 208 determines that the line is not approximately perpendicular to the edge, method 200 proceeds along a "No" path to block 206. As noted in part above, block 208 may also determine that a later point or other aspect of a gesture disqualifies the gesture. Examples include when a later point is within the edge, such as due to a hover, tap, press-and-hold, or up-and-down gesture (e.g., to scroll content in the user interface), or when the gesture is set to be a single-input gesture and a second input is received (e.g., a first finger starts at an edge but a second finger then lands anywhere).

If block 208 determines that the line is approximately perpendicular based a later point outside the edge, method 200 proceeds along a "Yes" path to block 210.

Figure 6:
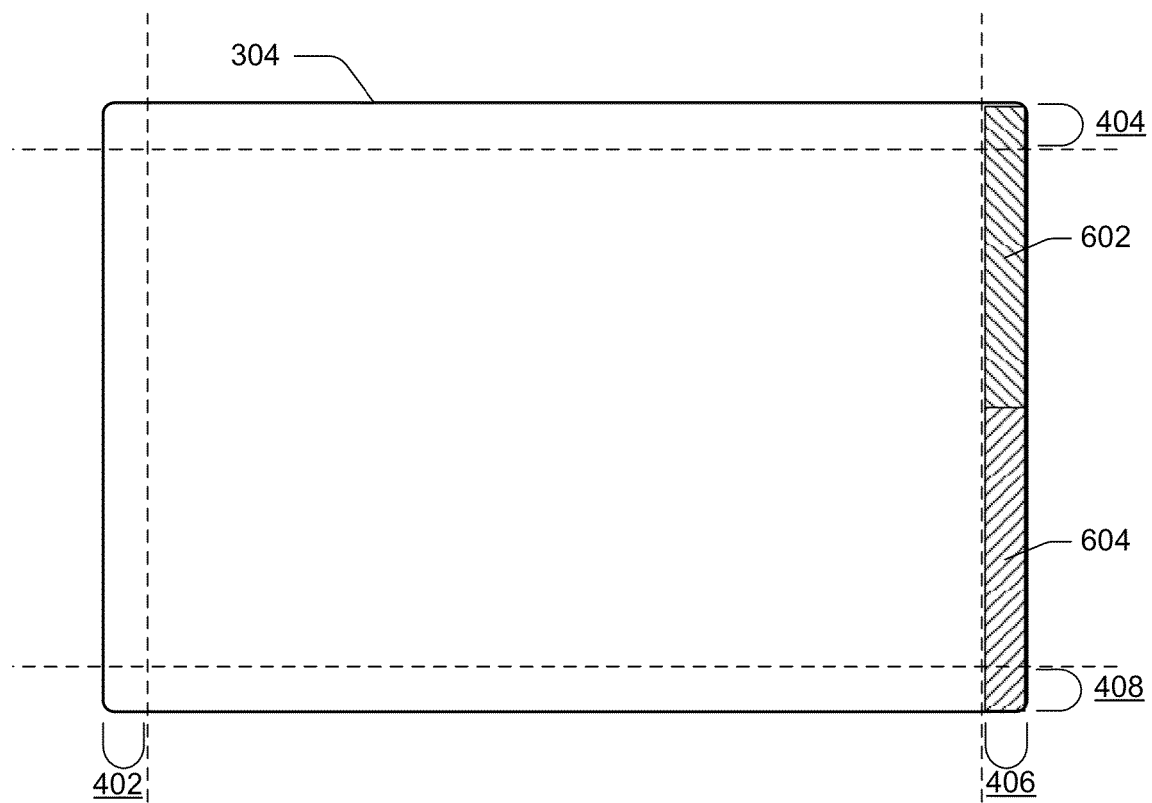
FIG. 6 illustrates the edges of the immersive interface shown in FIG. 4 along with two regions in the right edge.

Block 210 responds to the positive determination of block 208 by passing the gesture to an entity other than the exposed user interface. This entity is not a user interface over which the gesture was received, assuming it was received over a user interface at all. Block 210 may determine to which entity to pass the gesture as well, such as based on an edge or region of an edge in which the start point of the gesture is received. Consider FIG. 6, for example, which illustrates immersive interface 304 and edges 402, 404, 406, and 408 of FIG. 4 but adds top region 602 and bottom region 604 to right edge 406. A start point in top region 602 can result in a different entity (or even a same entity but a different user interface provided in response) than a start point received to bottom region 604. Likewise, a start point in top edge 404 can result in a different entity or interface than left edge 402 or bottom edge 408.

In some cases, this entity is an application associated with the user interface. In such a case, passing the gesture to the entity can be effective to cause the application to present a second user interface enabling interaction with the application. In the movie example above, the entity can be the media player playing the movie but not the immersive interface displaying the movie. The media player can then present a second user interface enabling selection of subtitles or a director's commentary rather than selections enabled by the interface displaying the movie, such as "pause," "play," and "stop." This capability is permitted in FIG. 1, where one of applications 134 can include or be capable of presenting more than one application user interface 136. Thus, block 210 can pass the gesture to system-interface module 126, the one of applications 134 currently presenting the user interface, or another of applications 134, to name just three possibilities.

Figure 7:
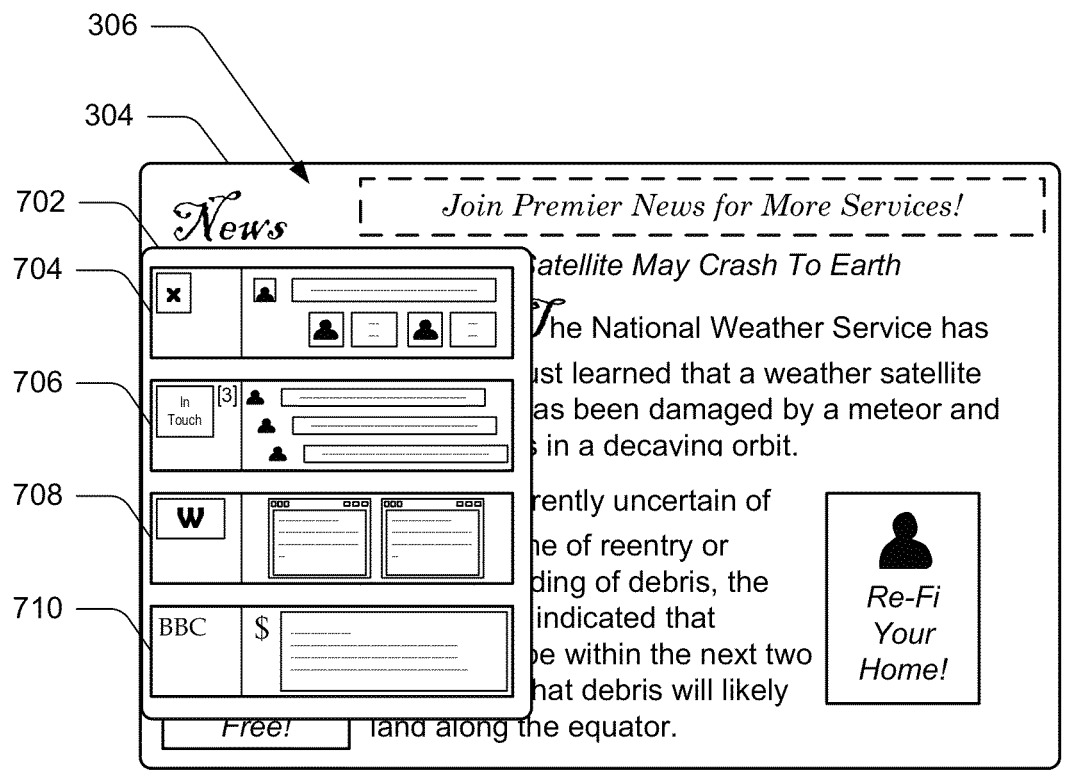
FIG. 7 illustrates an application-selection interface presented by a system-interface module in response to an edge gesture made over the immersive interface and webpage of FIG. 3.

Concluding the ongoing embodiment, at block 210 gesture handler 128 passes gesture 308 to system-interface module 126. System-interface module 126 receives the buffered portion of gesture 308 and continues to receive the rest of gesture 308 as it is made by the user. FIG. 7 illustrates a possible response upon receiving gesture 308, showing an application-selection interface 702 presented by system-interface module 126 and over immersive interface 304 and webpage 306 from FIG. 3. Application-selection interface 702 enables selection of various other applications and their respective interfaces at selectable application tiles 704, 706, 708, and 710.

The example application-selection interface 702 is an immersive user interface presented using immersive mode module 124, though this is not required. Presented interfaces may instead be windows-based and presented using windows-based module 122. Both of these modules are illustrated in FIG. 1.

Block 210 may also or instead determine to pass the gesture to different entities and/or interfaces based on other factors about the gesture received. Example factors are described in greater detail in method 800 below.

Note that method 200 and other methods described hereafter can be performed in real-time, such as while a gesture is being made and received. This permits, among other things, a user interface presented in response to a gesture to be presented prior to completion of the gesture. Further, the user interface can be presented progressively as the gesture is received. This permits a user experience of dragging out the user interface from the edge as the gesture is performed with the user interface appearing to "stick" to the gesture (e.g., to a mouse point or person's finger making the gesture).

Figure 8:
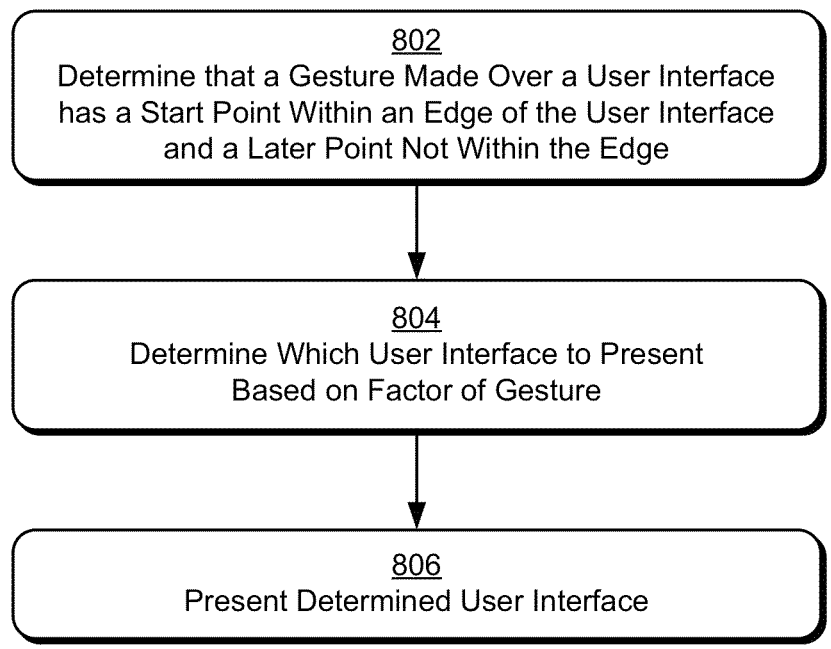
FIG. 8 illustrates an example method for enabling edge gestures including determining an interface to present based on some factor of the gesture.

FIG. 8 depicts a method 800 for enabling edge gestures including determining an interface to present based on some factor of the gesture. In portions of the following discussion reference may be made to system 100 of FIG. 1, reference to which is made for example only. Method 800 may act wholly or partly separate from or in conjunction with other methods described herein.

Block 802 determines that a gesture made over a user interface has a start point at an edge of the user interface and a later point not within the edge. Block 802 may operate similarly to or use aspects of method 200, such as determining a later point on which to base block 802's determination. Block 802 may act differently as well.

In one case, for example, block 802 determines that a gesture is a single-finger swipe gesture starting at an edge of an exposed immersive user interface and having a later point not at the edge but not based on an angle of the gesture. Based on this determination, block 802 proceeds to block 804 rather than pass the gesture to the exposed immersive user interface.

Block 804 determines which interface to present based on one or more factors of the gesture. Block 804 may do so based on a final or intermediate length of the gesture, whether the gesture is single or multi-point (e.g., a single-finger or multi-finger gesture), or a speed of the gesture. Thus, block 804 may determine to present a start menu in response to a multi-finger gesture, an application-selection interface in response to a relatively short single-finger gesture, or a system-control interface permitting selection to shut down computing device 102 in response to relatively long single-finger gesture, for example. To do so, gesture handler 128 may determine the length of the gesture or a number of inputs (e.g., fingers). In response, block 806 presents the determined user interface.

Assume, by way of example, that gesture handler 128 determines, based on a factor of the gesture, to present a user interface enabling interaction with operating system 120. In response system-interface module 126 presents this user interface. Presentation of the user interface can be similar to manners described in other methods, such as with a progressive display of application-selection user interface 702 of FIG. 7.

Figure 9:
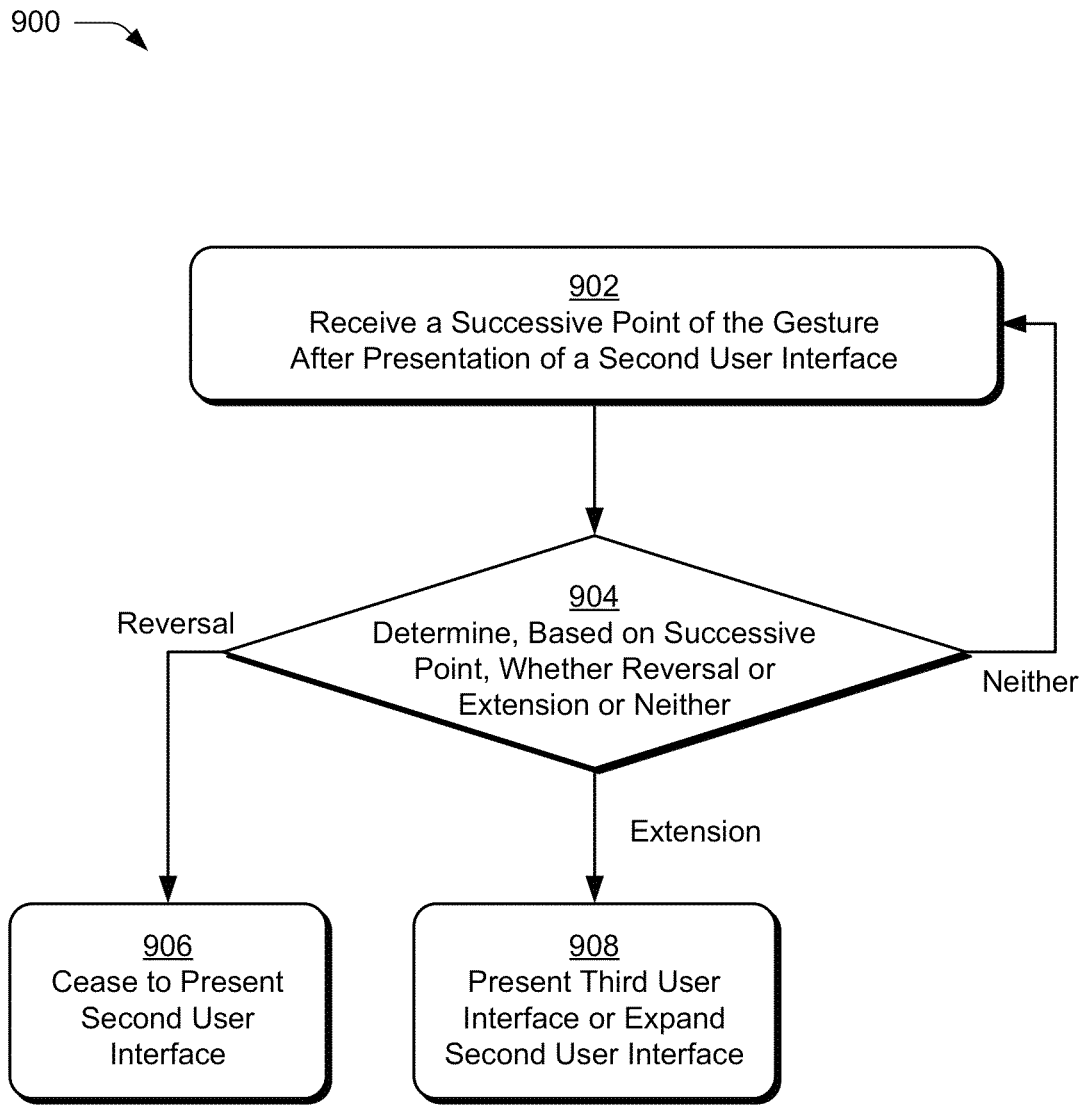
FIG. 9 illustrates an example method enabling expansion of, or ceasing presentation of, a user interface presented in response to an edge gesture or presentation of another user interface.

Following method 200 and/or method 800 in whole or in part, the techniques may proceed to perform method 900 of FIG. 9. Method 900 enables expansion of a user interface, presentation of another interface, or ceasing presentation of the user interface presented in response to an edge gesture.

Block 902 receives a successive point of the gesture and after presentation of at least some portion of the second user interface. As noted in part above, methods 200 and/or 800 are able to present or cause to be presented a second user interface, such as a second user interface for the same application associated with a current user interface, a different application, or a system user interface.

Figure 10:
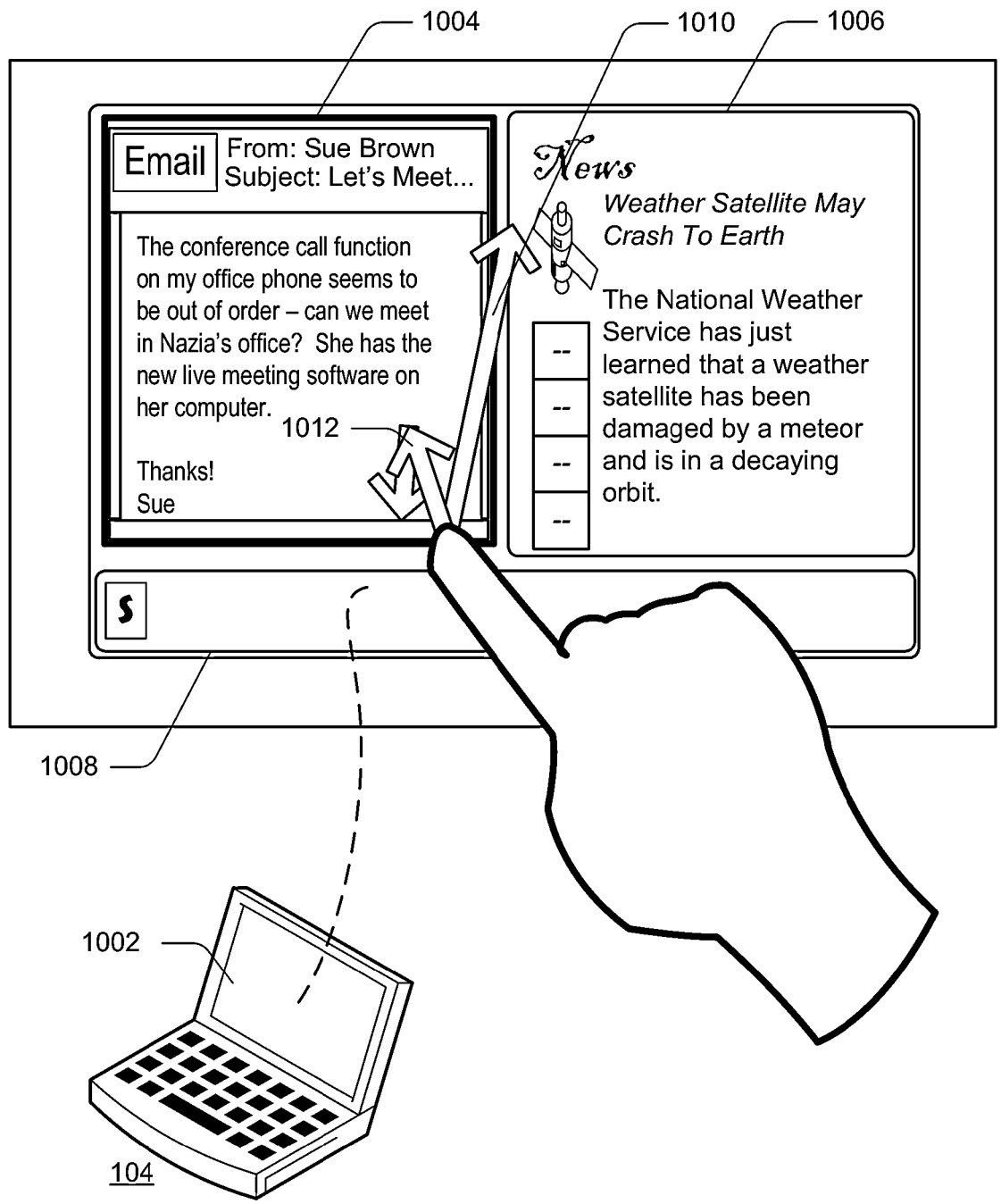
FIG. 10 illustrates a laptop computer having a touch-sensitive display having a windows-based email interface and two immersive interfaces.

By way of example, consider FIG. 10, which illustrates a laptop computer 104 having a touch-sensitive display 1002 displaying a windows-based email interface 1004 and two immersive interfaces 1006 and 1008. Windows-based email interface 1004 is associated with an application that manages email, which can be remote or local to laptop computer 104. FIG. 10 also illustrates two gestures, 1010 and 1012. Gesture 1010 proceeds in a straight line while gesture 1012 reverses back (shown with two arrows to show two directions).

Figure 11:
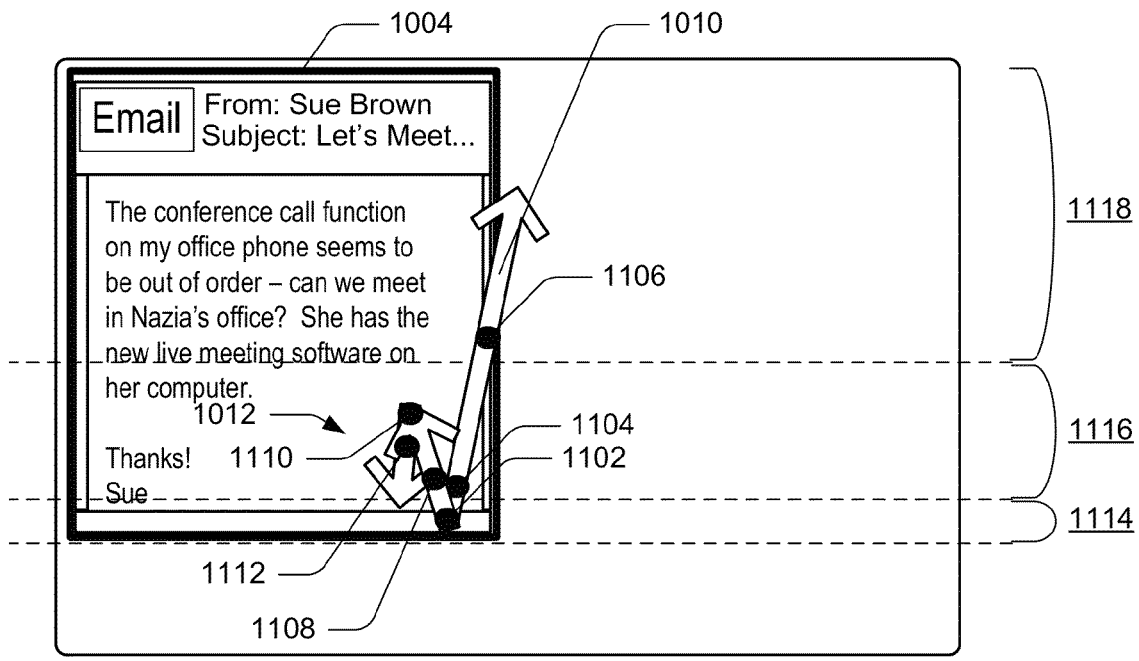
FIG. 11 illustrates the interfaces of FIG. 10 along with two gestures having a start point, later points, and one or more successive points.

FIG. 11 illustrates gesture 1010 having a start point 1102, a later point 1104, and a successive point 1106, and gesture 1012 having a same start point 1102, a later point 1108, and a first successive point 1110, and a second successive point 1112. FIG. 11 also shows a bottom edge 1114, a later-point area 1116, and an interface-addition area 1118.

Block 904 determines, based on the successive point, whether the gesture includes a reversal, an extension, or neither. Block 904 may determine a reversal by determining that a successive point is at the edge or is closer to the edge than a prior point of the gesture. Block 904 may determine that the gesture extends based on the successive point being a preset distance from the edge or the later point. If neither of these is determined to be true, method 900 may repeat blocks 902 and 904 to receive and analyze additional successive points until the gesture ends. If block 904 determines that there is a reversal, method 900 proceeds along "Reversal" path to block 906. If block 904 determines that the gesture is extended, method 900 proceeds along an "Extension" path to block 908.

In the context of the present example, assume that gesture handler 128 receives first successive point 1110 of gesture 1012. Gesture handler 128 then determines that first successive point 1110 is not at edge 1114, is not closer than a prior point of the gesture to edge 1114 (e.g., is not closer than later point 1108), and is not a preset distance from the edge or later point by not being within interface-addition region 1118. In such a case method 900 returns to block 902.

Figure 12:
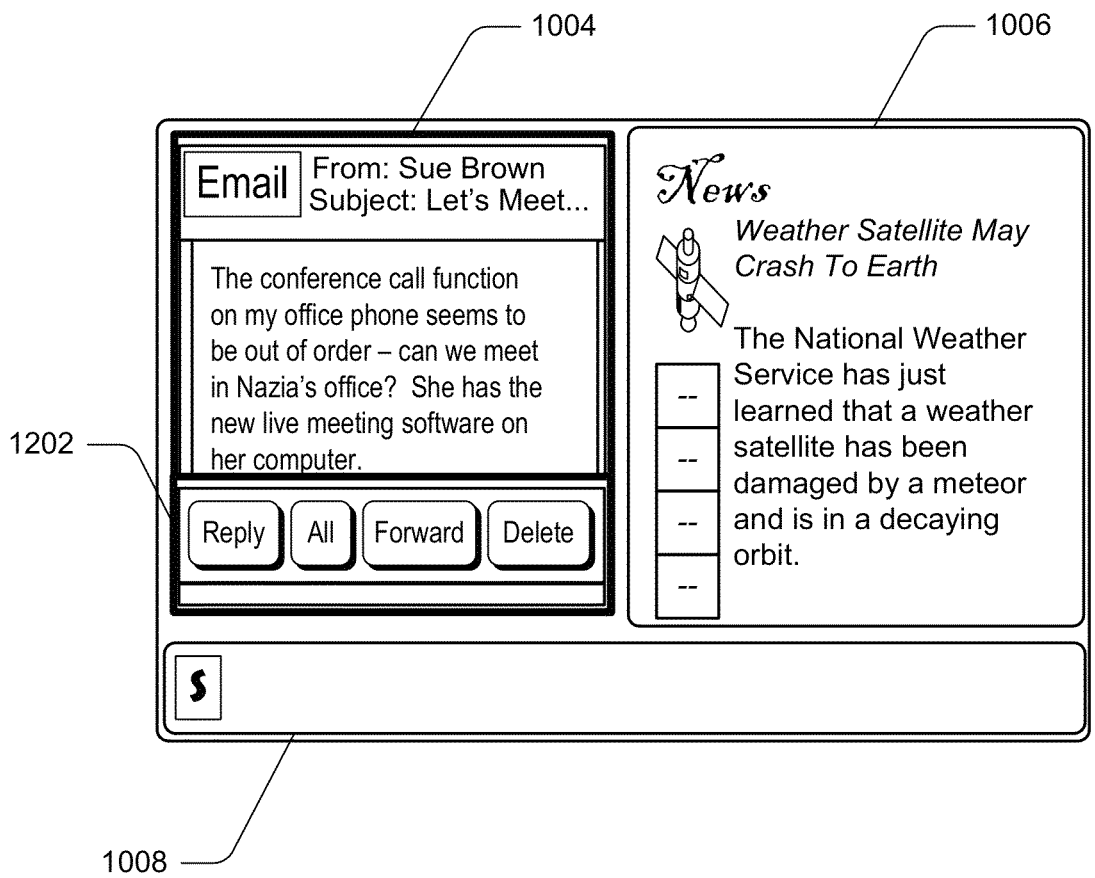
FIG. 12 illustrates the windows-based email interface of FIGS. 10 and 11 along with an email handling interface presented in response to an edge gesture.

On a second iteration of block 902, assume that gesture handler 128 receives second successive point 1112. In such a case, gesture handler 128 determines that second successive point 1112 is closer to edge 1114 than first successive point 1110 and thus gesture 1012 includes a reversal. Gesture handler 128 then proceeds to block 906 to cease to present the second user interface previously presented in response to the gesture. By way of example, consider FIG. 12, which illustrates an email handling interface 1202. In this example case of block 906, gesture handler 128 causes the email application to cease to present interface 1202 in response to a reversal of gesture 1012 (not shown removed).

Figure 13:
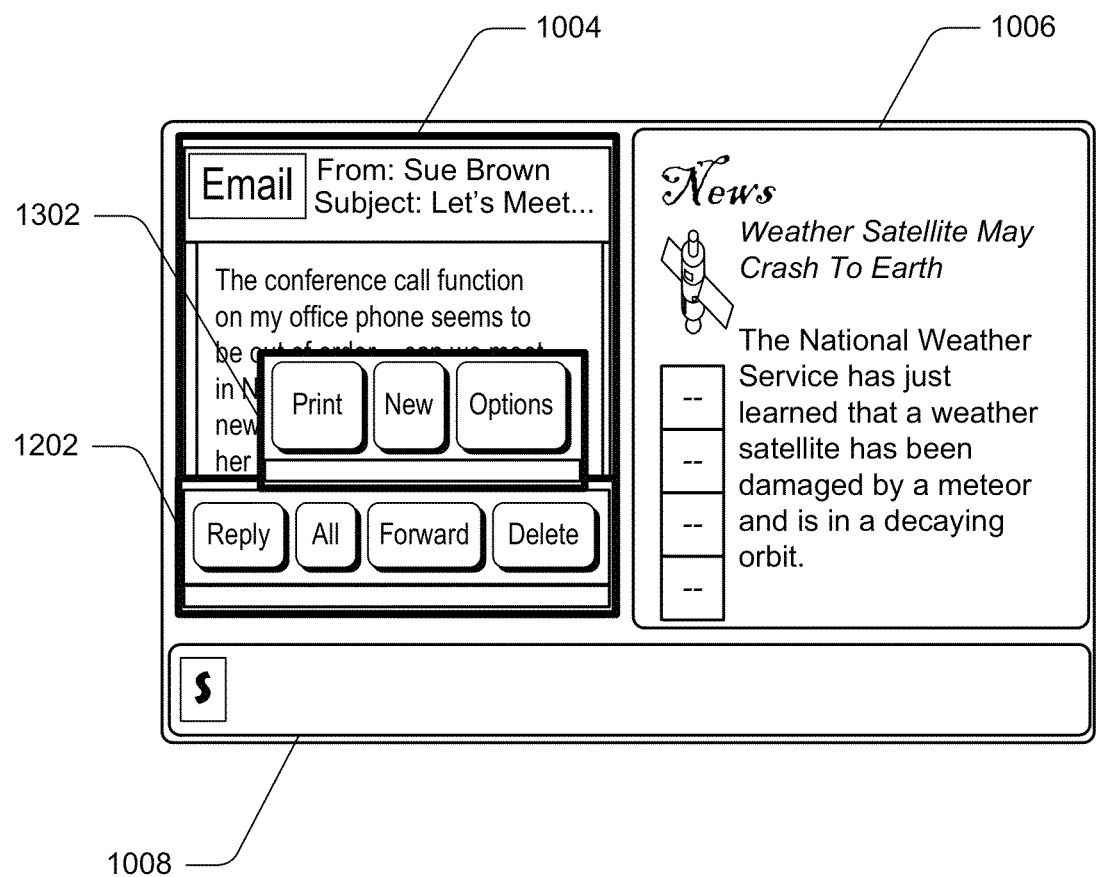
FIG. 13 illustrates the interfaces of FIG. 12 along with an additional-email-options interface presented in response to a gesture determined to have a successive point a preset distance from the edge.

Block 908, however, presents or causes presentation of a third user interface or expansion of the second user interface. Continuing the ongoing example, consider FIG. 13, which illustrates additional-email-options interface 1302 in response to gesture 1010 determined to have successive point 1106 a preset distance from edge 1104, in this case being within interface-addition region 1118 of FIG. 11. This region and preset distance can be set based on a size of the user interface previously presented in response to the gesture. Thus, a user wishing to add additional controls may simply extend the gesture past the user interface presented in response to an earlier portion of the gesture.

Method 900 can be repeated to add additional user interfaces or expand a presented user interface. Returning to the example interface 702 of FIG. 7, for example, gesture handler 128 can continue to add interfaces or controls to interface 702 as gesture 308 extends past interface 702, such as by presenting an additional set of selectable application tiles. If gesture 308 extends past the additional tiles, gesture handler 128 may cause system-interface module 124 to present another interface adjacent the tiles to enable the user to select controls, such as to suspend, hibernate, switch modes (immersive to windows-based and the reverse), or shut down computing device 102.

While the above example user interfaces presented in response to an edge gesture are opaque, they may also be partially transparent. This can be useful by not obscuring content. In the movie example described above, a user interface presented can be partially transparent thereby permitting the movie to be only partially obscured during use of the user interface. Similarly, in the example of FIGS. 12 and 13, interfaces 1202 and 1302 may be partially transparent, thereby enabling a user to see the text of the email while also selecting a control in one of the interfaces.

As noted above, example methods 200, 800, and 900 address edge gestures and are described prior to methods 1400 and 1700, which address switching back to a previously-interacted-with application. Any one or more of methods 200, 800, and 900 may be used separately or in combination with, in whole or in part, methods 1400 and 1700.

Figure 14:
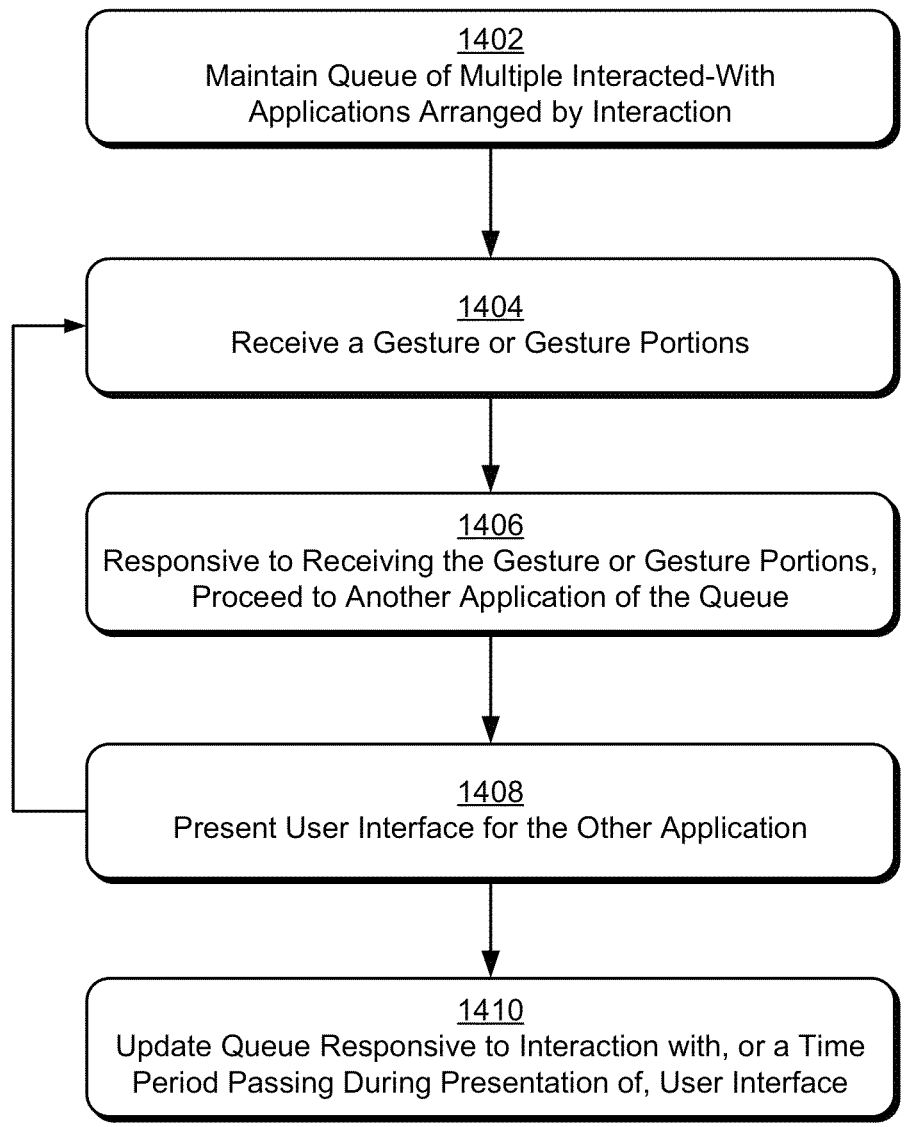
FIG. 14 illustrates a method for switching back to a previously-interacted-with application using a queue.

FIG. 14 depicts a method 1400 for switching back to a previously-interacted-with application using a queue. In portions of the following discussion reference may be made to system 100 of FIG. 1, methods 200, 800, and/or 900, and example embodiments described above, reference to which is made for example only.

Block 1402 maintains a queue of multiple interacted-with applications, the queue arranged by most-recently-interacted-with to least-recently-interacted-with applications other than a current application. Consider, for example, FIG. 15, which illustrates an interaction order 1502 in which a user interacts with various applications. First, the user interacts with a web-searching application 1504 through its interface. Second, the user interacts with a web-enabled media application 1506 through a web browser. Third, the user interacts with a local (non-web) photo application 1508 through its interface. Fourth, the user interacts with a social-networking application 1510 through the web browser. Fifth, the user returns to interacting with the web-enabled media application 1506. Sixth, the user interacts with a web-enabled news application 1512 again through the web browser.

For the first interaction no queue is maintained as no other applications have been interacted with prior to this first interaction. For the second through sixth interactions of interaction order 1502, consider queues 1514, 1516, 1518, 1520, and 1522, which correspond to each interaction in interaction order 1502 after the first interaction, respectively. Queues 1514 to 1522 are example iterations of application queue 132 maintained by application manager 130, both of FIG. 1.

Figure 15:
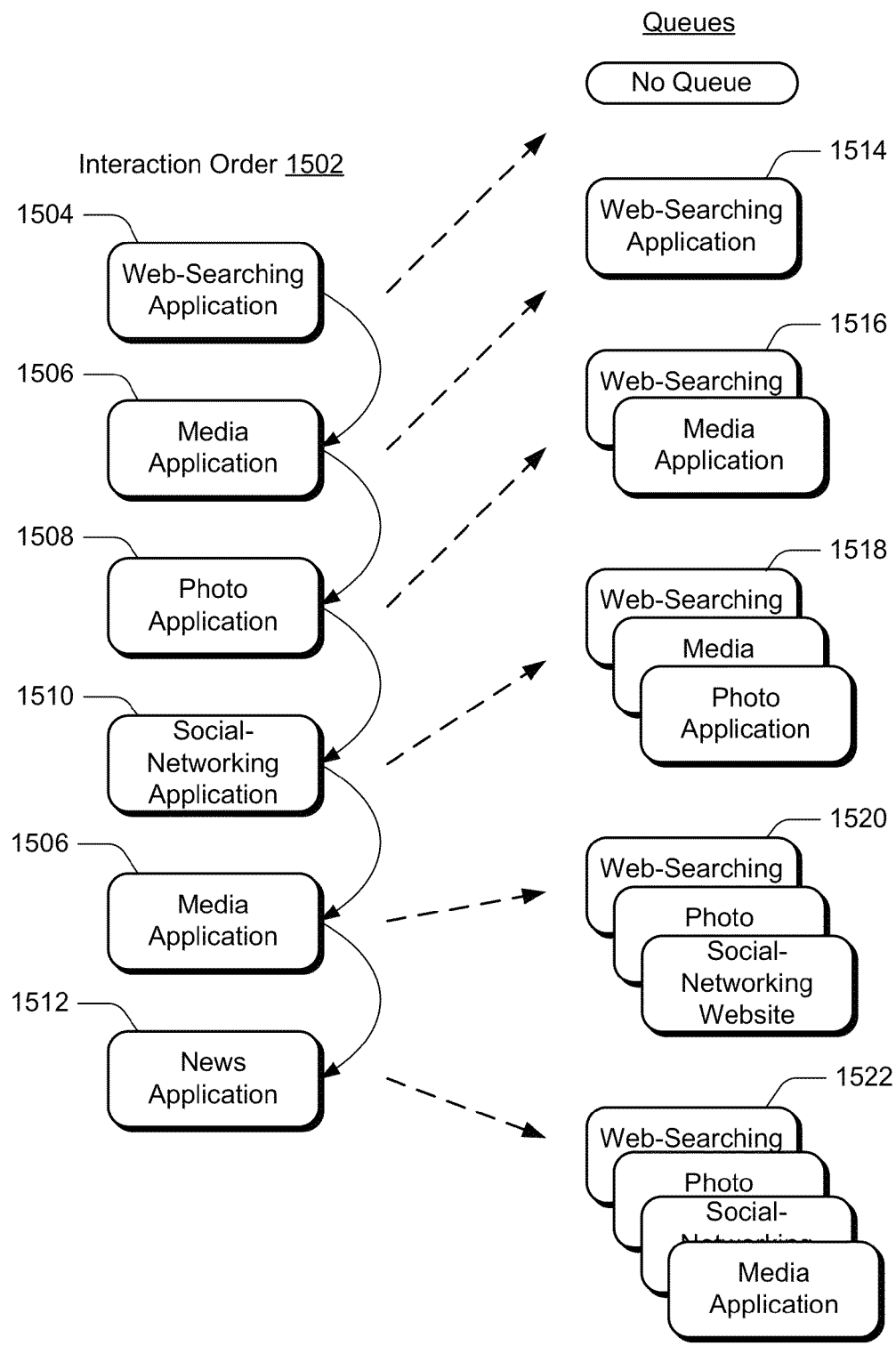
FIG. 15 illustrates an example interaction order in which a user interacts with various applications.

As shown in FIG. 15, application manager 130 keeps application queue 132 up-do-date based on a user's interactions. Queue 1522, for example, includes media application 1506 as the most-recently-interacted application, followed by social-networking application 1510, photo application 1508, and ending with web-searching application 1504. As the user interacts with media application 1506 twice (at the second and fifth interaction) application manager 130 removes it from application queue 130 at the fifth interaction and reorders the other applications to reflect an up-to-date order of interactions but excluding currently-interacted-with applications.

Block 1404 receives a gesture or gesture portions. This gesture or gesture portions can include one or more of the various gestures or portions described elsewhere herein, such as a pointer tracking a movement received through a touch pad, mouse, or roller ball or a physical movement made with arm(s), finger(s), or a stylus received through a motion-sensitive or touch-sensitive mechanism. In some embodiments, gesture portions are received, each portion being part of one gesture and each resulting in presentation of an application in the queue. Each of these portions may have, but are not required to have, a start point at an edge of a display, a later point not at the edge of the display, and a successive point at the edge of the display. A gesture having multiple portions in this case would look something like a multi-loop spiral, multiple circles, or a back-and-forth (e.g., zigzag) where each loop, circle, or back-and-forth starts, leaves, and returns to an edge of a user interface or display. Optionally, block 1404 may receive a number of gestures or gesture portions. These gestures or gesture portions can include one or more of the various gestures or gestures portions described elsewhere herein.

Continuing the ongoing embodiment, consider again FIG. 3, which illustrates tablet computing device 106 having touch-sensitive display 302 shown displaying immersive interface 304 including webpage 306. For this example, assume that immersive interface 304 is associated with news application 1512 and that webpage 306 is content from news application 1512.

As part of this example, at block 1404, gesture handler 128 receives gesture 308 as shown in FIG. 3, which gesture handler 128 passes to application manager 130. For the ongoing example, assume that gesture 308 is determined to be associated with switching back to a previously-interacted-with application rather than some other function or application.

Block 1406, responsive to receiving the gesture or gesture portions, precedes through the queue to another application of the multiple interacted-with applications. Thus, on receiving the gesture or gesture portion(s), application manager 130 may precede to the first, and thus the most-recently-interacted-with of the applications of application queue 132. In some embodiments, on receiving two gestures or portions, application manager 130 may proceed to the second most-recently-interacted-with application of application queue 132, though method 1400 may do so by repeating blocks 1404, 1406 and/or 1408, and so forth as described below.

Continuing the ongoing embodiment, assume that gesture 308 is received after the sixth interaction at which time the currently-interacted-with application is news application 1512 and that application queue 132 is up-to-date and represented by queue 1522 of FIG. 15. In such a case, application manager 130 proceeds to media application 1506 on receiving the gesture or gesture portion.

Block 1408 presents a user interface associated with the other application. This user interface, in some embodiments, is the same user interface through which interaction with the application was previously made. In some embodiments, the user interface is presented as a thumbnail or transparent overlay above the currently presented user interface. Application manager 130 presents this user interface alone or in combination with the associated application, such as by causing the associated application to present the user interface with which the user last interacted.

For this example, application manager 130 presents a thumbnail image of the user interface for the application progressively as gesture 308 is received and then expands the thumbnail to encompass the available real estate of the display when the gesture ends. Application manager 130 thereby replaces webpage 306 in immersive interface 304 or replaces immersive interface 304 with another interface, which can be immersive or windows-based.

Figure 16:
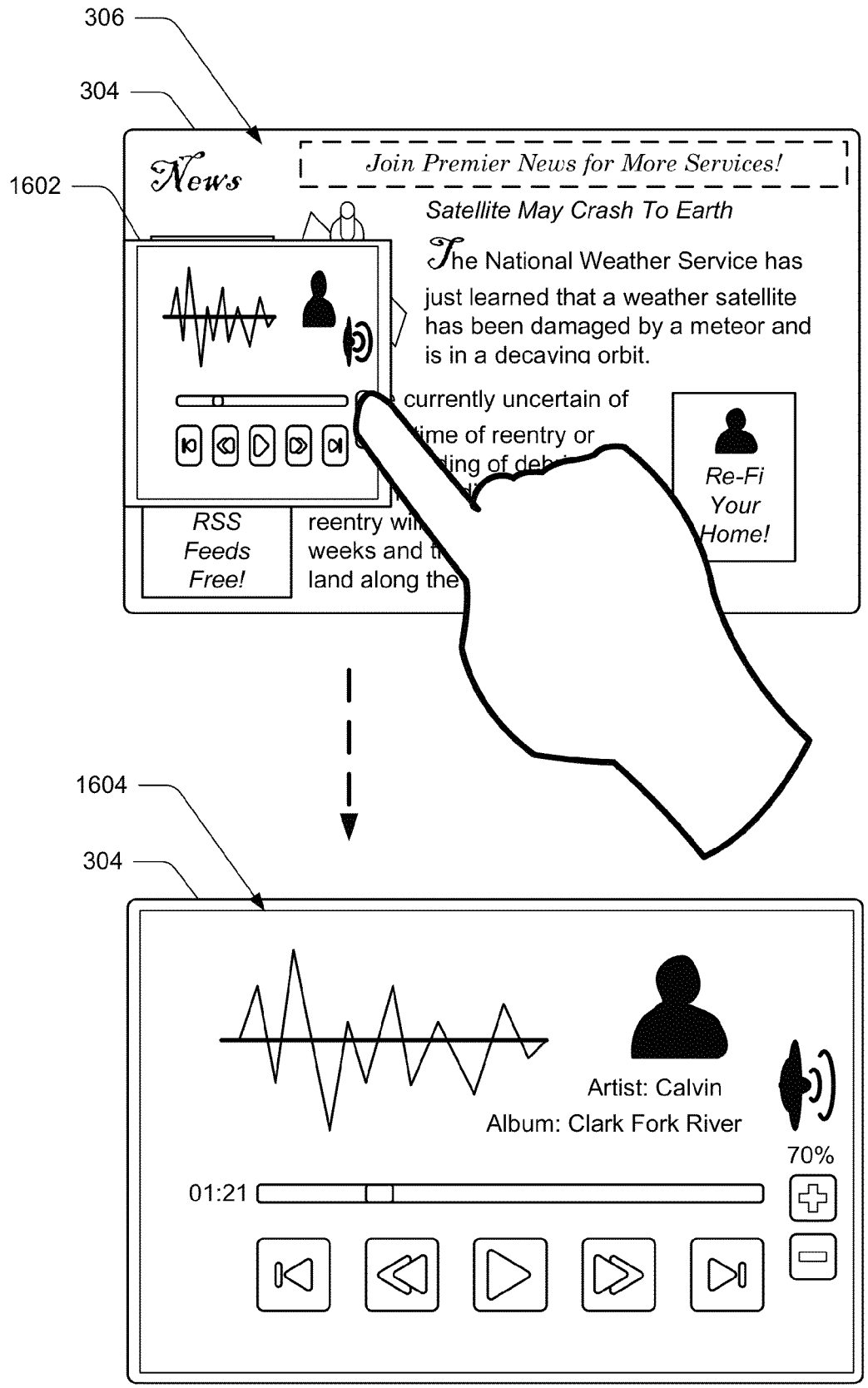
FIG. 16 illustrates the immersive interface of FIG. 3 along with a thumbnail image of a user interface of a prior application.

This is illustrated in FIG. 16 with thumbnail image 1602 of a user interface of media application 1506 presented over immersive interface 304 and webpage 306 of news application 1510. After gesture 308 ends, thumbnail image 1602 expands into full image 1604, replacing webpage 306 in immersive interface 304. This is but one example manner for presenting the user interface for the selected application, others manners for responding progressively or otherwise are described elsewhere herein.

In some embodiments, block 1408 shrinks the current user interface to a second thumbnail image and passes the second thumbnail image toward a region of a display from which the first-mentioned thumbnail image is progressively presented. Thus, block 1408 expands thumbnail image 1602 into full image 1604 while shrinking webpage 306 to a thumbnail image and passing that thumbnail to the edge from which thumbnail image 1602 was selected.

During the presentation of the user interface at block 1408, another gesture or gesture portion may be received, returning to block 1404. In some cases, the other gesture or gesture portion is received within an amount of time while the user interface is presented by block 1408. Following the return to block 1404, block 1406 may then proceed to yet another or subsequent application of the multiple interacted-with applications. Continuing this progression, block 1408 then presents a user interface associated with the subsequent application of the multiple interacted-with applications.

Thus, by repeating blocks 1404, 1406, and 1408 user interfaces associated with previously interacted-with applications can be successively presented. In some cases, a user interface associated with a previously-interacted with application can be presented responsive to each gesture received. In the context of the present example, when another gesture is received while presenting the user interface of media application 1506, a user interface associated with social-networking application 1510 (the second most-recently interacted with application of queue 1522) is presented. Receiving yet another gesture or gesture portion during the presentation of the user interface associated with social-networking application 1510 results in a presentation of a user interface associated with photo application 1508 (the third most-recently interacted with application of queue 1522) and so forth.

Following this switch from presenting a current application to presenting another selected, prior application, block 1410 updates the queue responsive to interaction with, or a time period passing during presentation of, the user interface associated with the other application. In some cases a prior application may be selected and then another quickly selected after it, effectively a scanning through of the applications in the queue. In such cases, block 1410 may forgo updating the queue, as a quick viewing may not be considered an interaction.

Example interactions with which application manager 130 updates application queue 132 include an explicit selection to interact with the newly presented interface, such as to control playback or edit information relating to currently playing media using controls shown in the user interface of media player 1604 of FIG. 16. In other cases an interaction is determined based on a time period passing. Assume, for example, that the news application's webpage is presented on selection rather than being the current application. After some period, such as one, two, or three seconds, for example, application manager 130 determines that the delay is effectively an interaction based on a likelihood that the user is reading the news article in the webpage. Similarly, presentation of a user interface for a media application at block 1408 that is playing media and remains on the display without another selection of applications in application queue 132 can also be considered an interaction.

As noted in part above, application queue 132 can be circular. In so doing, selection of applications is not stopped but rather rolls if a user reaches a least-recently-interacted with application of application queue 132. For example, on selecting to switch back to a prior application from social-networking application 1510 and thus using queue 1518, switching back once results in selecting photo application 1508, twice results in media application 1506, and three times to web-searching application 1504. A fourth selection to switch back returns, in a circular fashion, to again result in presenting photo application 1508.

Method 1400 describes various ways in which the techniques can enable selection of previously-interacted-with applications and determine which to present based on a queue. Method 1700 may operate in conjunction with method 1400 and other methods described herein, though using a queue is not required. Therefore, method 1400 is not intended to limit the techniques as described in example method 1700.

Figure 17:
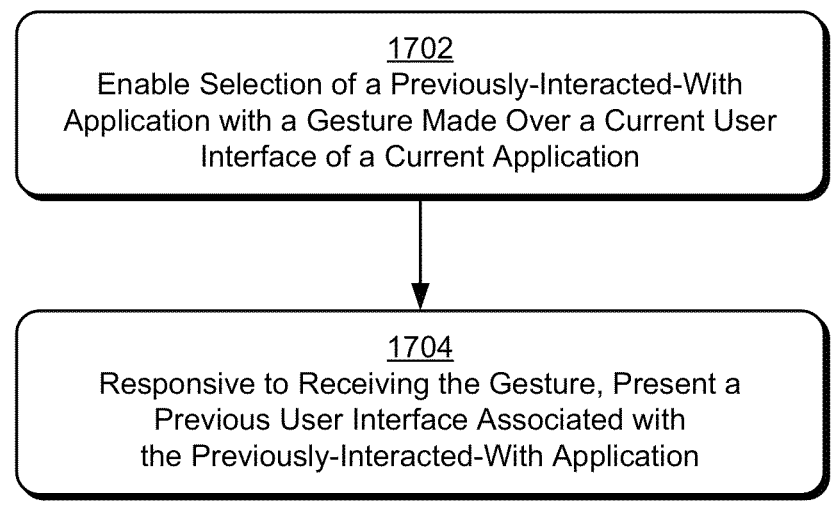
FIG. 17 illustrates a method for switching back to a previously-interacted-with application, which may or may not use a queue.

FIG. 17 depicts a method 1700 for switching back to a previously-interacted-with application, which may or may not use a queue. In portions of the following discussion reference may be made to system 100 of FIG. 1, methods 200, 800, 900, 1400, and example embodiments described above, reference to which is made for example only.

Block 1702 enables selection of a previously-interacted-with application through a gesture made over a current user interface associated with a current application. Block 1702 may do so in various manners described above, such as with an edge gesture or portion thereof, as but one example.

Block 1704, responsive to receiving the gesture and without further selection, presents a previous user interface associated with the previously-interacted-with application.

Assume, for example, that a portion of a gesture is received associated with selection of a prior application, such as an edge gesture starting at an edge of the current user interface and proceeding approximately perpendicularly away from the edge. In response, block 1704 presents the user interface for the previously-interacted-with application or a thumbnail image of the interface, or some indicator that selection has successfully been made along with an indicator of the application or the interface selected.

Example thumbnail images or indicators include any of selectable application tiles 704, 706, 708, and 710 of FIG. 7 some of which include a thumbnail image of an interface while other indicate the application selected. Another example is thumbnail image 1602 of FIG. 16.

Block 1704 presents the user interface of the selected, previously-interacted-with application, as shown in FIG. 16 at full image 1604. In so doing, block 1704 may enable interaction with photo application 1508 through immersive interface 304 without further selection. Thus, a user after selecting, with as little as one gesture, a prior application may interact without needing to make another selection. The user need not select to exit an application-selection mode, for example, or make the presented interface "live" or primary or on top of the stack. Simply put, the techniques enable selection of a prior application and further interaction with that prior application with a single input.

In this example of FIG. 16, immediately after full image 1604 is presented and replaces webpage 306, a next input to immersive interface 304 is passed immediately to photo application 1508. Thus, a tap, hot key, or other input is passed directly to photo application 1508, thereby enabling an immediate response by photo application 1508 to the input.

In some embodiments, the gesture made over the current user interface includes portions, each of which indicates a selection of a prior application. In such a case, block 1704 presents the previous user interface in response to the first portion and then, responsive to block 1702 receiving the second portion of the gesture, presents a further-previous user interface associated with a further previously-interacted-with application, and so forth.

Figure 18:
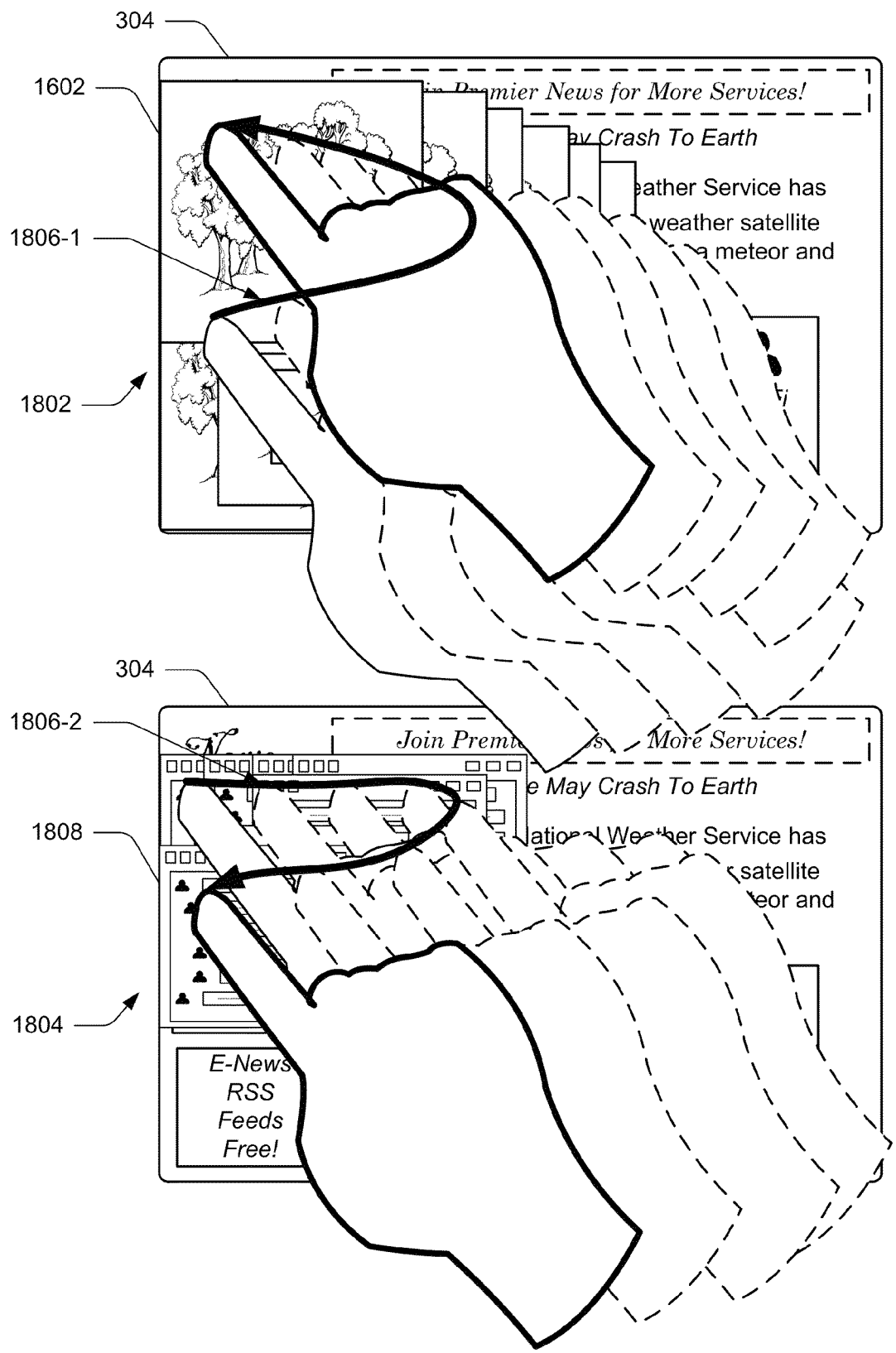
FIG. 18 illustrates the immersive interface of FIGS. 3 and 16, two progressive presentations, and two gesture portions.

This is illustrated in FIG. 18, which presents immersive interface 304 of FIG. 16 (shown twice for visual clarity), and ways in which block 1704 can respond to multiple gestures or portions of a single gesture. FIG. 18 illustrates two progressive presentations, 1802 and 1804, and gesture 1806 having two gesture portions 1806-1 and 1806-2, respectively. First progressive presentation 1802 illustrates a drag from a left edge of immersive interface 304 of thumbnail image 1602, and thus selection of the previously-interacted with photo application 1508. Note that thumbnail image 1602 "sticks" to gesture portion 1806-1. Note also that gesture 1806, unlike gesture 308 of FIGS. 3 and 16, returns to the left edge. In response, rather than gesture 308 ending and full image 1604 replacing webpage 306, gesture portion 1806-1 of gesture 1806 returns to the edge at which it began. In this case thumbnail image 1602 is progressively displayed with gesture portion 1806-1 but then disappears when gesture portion 1806-1 returns to the edge or another invalid gesture ending position.

Gesture 1806 continues with second portion 1806-2. In response, block 1704 presents second progressive presentation 1804, illustrating a second drag from the left edge of immersive interface 304. Here a social network thumbnail image 1808 of a further prior application, social-networking application 1510, is progressively presented. Gesture 1806 returns to the left edge as part of second portion 1806-2. In response, block 1704 drops off thumbnail image 1808 when gesture portion 1806-2 returns to the edge. This is but one example of ways in which the techniques enable users to select and view prior applications, even all of the previously-interacted-with applications, with only a single gesture. At any point in this example, gesture 1806 may end or indicate selection to present the full user interface for the selected application, at which time block 1704 presents the user interface (e.g., full image 1604 of FIG. 16 or a full user interface for the social-networking application).

The preceding discussion describes some methods in which the techniques may enable switching back to a previously-interacted-with application. Other methods describe ways in which the techniques enable and/or use edge gestures. These methods are shown as sets of blocks that specify operations performed but are not necessarily limited to the order shown for performing the operations by the respective blocks.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

EXAMPLE DEVICE

Figure 19:
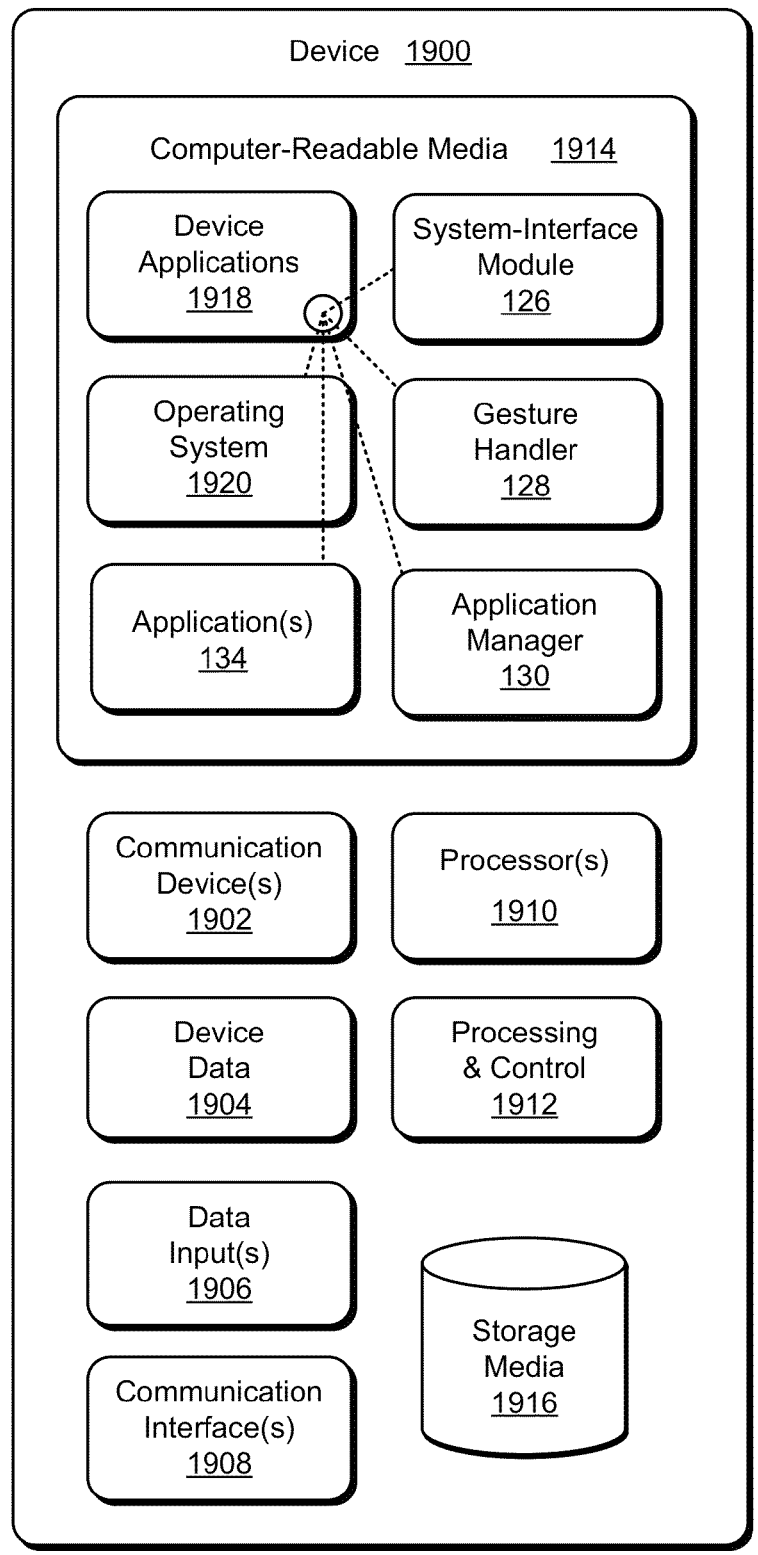
FIG. 19 illustrates an example device in which techniques for switching back to a previously-interacted-with application can be implemented.

FIG. 19 illustrates various components of example device 1900 that can be implemented as any type of client, server, and/or computing device as described with reference to the previous FIGS. 1-18 to implement techniques enabling and using edge gestures and/or switching back to a previously-interacted-with application. In embodiments, device 1900 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1900 may also be associated with a user (e.g., a person) and/or an entity that operates the device such that a device describes logical devices that include users, software, firmware, and/or a combination of devices.

Device 1900 includes communication devices 1902 that enable wired and/or wireless communication of device data 1904 (e.g., received data, data that is being received, data scheduled for broadcast, data packets of the data, etc.). The device data 1904 or other device content can include configuration settings of the device, media content stored on the device, and/or information associated with a user of the device. Media content stored on device 1900 can include any type of audio, video, and/or image data. Device 1900 includes one or more data inputs 1906 via which any type of data, media content, and/or inputs can be received, such as user-selectable inputs, messages, music, television media content, recorded video content, and any other type of audio, video, and/or image data received from any content and/or data source.

Device 1900 also includes communication interfaces 1908, which can be implemented as any one or more of a serial and/or parallel interface, a wireless interface, any type of network interface, a modem, and as any other type of communication interface. The communication interfaces 1908 provide a connection and/or communication links between device 1900 and a communication network by which other electronic, computing, and communication devices communicate data with device 1900.

Device 1900 includes one or more processors 1910 (e.g., any of microprocessors, controllers, and the like), which process various computer-executable instructions to control the operation of device 1900 and to enable techniques for switching back to a previously-interacted-with application. Alternatively or in addition, device 1900 can be implemented with any one or combination of hardware, firmware, or fixed logic circuitry that is implemented in connection with processing and control circuits which are generally identified at 1912. Although not shown, device 1900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1900 also includes computer-readable storage media 1914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1900 can also include a mass storage media device 1916.

Computer-readable storage media 1914 provides data storage mechanisms to store the device data 1904, as well as various device applications 1918 and any other types of information and/or data related to operational aspects of device 1900. For example, an operating system 1920 can be maintained as a computer application with the computer-readable storage media 1914 and executed on processors 1910. The device applications 1918 may include a device manager, such as any form of a control application, software application, signal-processing and control module, code that is native to a particular device, a hardware abstraction layer for a particular device, and so on.

The device applications 1918 also include any system components or modules to implement the techniques, such as device applications 1918 including system-interface module 122, gesture handler 128, application manager 130, and application(s) 134.

CONCLUSION

Although embodiments of techniques and apparatuses for switching back to a previously-interacted-with application have been described in language specific to features and/or methods, it is to be understood that the subject of the appended claims is not necessarily limited to the specific features or methods described. Rather, the specific features and methods are disclosed as example implementations for switching back to a previously-interacted-with application.

What is claimed is:

1. A computer-implemented method comprising:
   receiving a first gesture over a current user interface associated with a current application, the current user interface currently presented on a display, the first gesture having a first point at an edge of the current user interface and a second point not at the edge of the current user interface, receipt of the first gesture automatically causing without further input:
      selection of a most-recently-interacted-with application from a queue of interacted-with applications arranged by most-recently-interacted-with application to least-recently-interacted-with application other than the current application;
      presentation of a most-recently-interacted-with user interface of the most-recently-interacted-with application, the most-recently-interacted-with user interface presented with content for user consumption and without occlusion on the display; and
      cessation of presentation of the current user interface on the display or overlay of the most-recently-interacted-with user interface over the current user interface on the display; and
   determining that a first defined time period has passed since presentation of the most-recently-interacted-with user interface associated with the most-recently interacted with application, the first defined time period passing interpreted to be an interaction between the user and the most-recently-interacted-with user interface;
   responsive to determining that the defined time period has passed and without further input, updating the queue to reflect the selection of the most-recently-interacted-with application;
   receiving a second gesture over the most-recently-interacted-with user interface, the second gesture selecting a second-most-recently-interacted-with application;
   receiving a third gesture selecting a third-most-recently-interacted-with application within a second defined time period from the queue of interacted-with applications; and
   responsive to the selection of the third-most-recently-interacted-with application being received within the second defined time period of receiving the selection of the second-most-recently-interacted-with application, not updating the queue of interacted-with applications to reflect the selection of the second-most-recently-interacted-with application, the first defined time period being greater than a time threshold and the second defined time period being less than the time threshold, the time threshold being between one and four seconds.

2. A computer-implemented method as described in claim 1, wherein receiving selection of the most-recently-interacted-with application is not received through a visible, selectable control presented over the current user interface or on the display presenting the current user interface.

3. A computer-implemented method as described in claim 1, wherein the first gesture is received through a mouse-like device and represented by movement of a point or indicator over the current user interface.

4. A computer-implemented method as described in claim 1, wherein the presentation of the most-recently-interacted-with user interface progressively places the most-recently-interacted-with user interface at a region of the display at which the current user interface resides.

5. A computer-implemented method as described in claim 1, wherein the presentation of the most-recently-interacted-with user interface includes presentation of a thumbnail image of the most-recently-interacted-with user interface progressively with the first gesture as the first gesture is received and, responsive to the first gesture ending, expanding the thumbnail image.

6. A computer implemented method as described in claim 1, wherein the queue of interacted-with applications is not maintained prior to a first user interaction with an application.

7. A computer-implemented method as described in claim 1, wherein the current user interface currently presented on the display fully occupies the display without occlusion until presentation of the most-recently-interacted-with user interface and, subsequent to presentation of the most-recently-interacted-with user interface on the display, the most-recently-interacted-with user interface fully occupies the display.

8. The computer-implemented method as described in claim 1, wherein receiving the selection of the second-most-recently-interacted-with application followed by receiving the selection of the third-most-recently-interacted-with application within the second defined time period is interpreted to be a quick scanning through of the applications in the queue.

9. The computer-implemented method as described in claim 1, wherein the time threshold is between two and three seconds.

10. The computer-implemented method as described in claim 1, wherein the time threshold is between three and four seconds.

11. One or more computer-readable hardware storage devices storing instructions that, responsive to execution by a computing device, cause the computing device to perform operations comprising:
  receiving a first gesture over a current user interface associated with a current application, the current user interface currently presented on a display, the first gesture having a first point at an edge of the current user interface and a second point not at the edge of the current user interface, receipt of the first gesture automatically causing without further input:
    determining a most-recently-interacted-with application from a queue of interacted-with applications arranged by most-recently-interacted-with application to least-recently-interacted-with application other than the current application;
    presenting a most-recently-interacted-with immersive user interface associated with the determined most-recently-interacted-with application, the presenting expanding the most-recently-interacted-with immersive user interface associated with the most-recently-interacted-with application to fully occupy the display while simultaneously shrinking the current immersive user interface of the current application; and
    enabling interaction with the most-recently-interacted-with application through the most-recently-interacted-with immersive user interface without further interaction following receipt of the gesture;
  determining that a first defined time period has passed since presentation of the most-recently-interacted-with immersive user interface associated with the determined most-recently interacted with application, the determining effective to determine that the most-recently-interacted-with immersive user interface is being interacted with;
  responsive to the determining that the first defined time period has passed and without further input, updating the interacted-with application queue to reflect the presentation of the most-recently-interacted-with application;
  receiving a second gesture over the most-recently-interacted-with immersive user interface, the second gesture selecting a second-most-recently-interacted-with application;
  receiving a third gesture selecting a third-most-recently-interacted-with application within a second defined time period from the queue of interacted-with applications; and
  responsive to the selection of the third-most-recently-interacted-with application being received within the second defined time period of receiving the selection of the second-most-recently-interacted-with application, not updating the queue of interacted-with applications to reflect the selection of the second-most-recently-interacted-with application, the first defined time period being greater than a time threshold and the second defined time period being less than the time threshold, the time threshold being between one and four seconds.

12. The one or more computer-readable hardware storage devices of claim 11, wherein the shrunken current immersive user interface is a thumbnail image and wherein moving the shrunken current immersive user interface moves the thumbnail image to a region from which the most-recently-interacted-with immersive user interface associated with the most-recently-interacted-with application is expanded.

13. The one or more computer-readable hardware storage devices of claim 11, wherein the queue of interacted-with applications is circular effective to cause selections to proceed past the least-recently-interacted-with application in the queue to the most-recently-interacted-with application in the queue.

14. The one or more computer-readable hardware storage devices of claim 11, wherein the time threshold is between two and three seconds.

15. A system comprising:
  a gesture-sensitive display;
  one or more computer processors; and
  one or more computer-readable storage media having processor-executable instructions thereon that, responsive to execution by the one or more computer processors, perform operations comprising:
    receiving a first gesture over a current user interface associated with a current application, the current user interface currently presented on the gesture-sensitive display, the first gesture having a first point at an edge of the current user interface and a second point not at the edge of the current user interface, receipt of the first gesture automatically causing without further input:
      selection of a most-recently-interacted-with application from a queue of interacted-with applications arranged by most-recently-interacted-with application to least-recently-interacted-with application other than the current application;
      presentation of a most-recently-interacted-with user interface of the most-recently-interacted-with application, the most-recently-interacted-with user interface presented with content for user consumption and without occlusion on the gesture-sensitive display; and
      cessation of presentation of the current user interface on the gesture-sensitive display or overlay of the most-recently-interacted-with user interface over the current user interface on the gesture-sensitive display; and
    determining that a first defined time period has passed since presentation of the most-recently-interacted-with user interface associated with the most-recently interacted with application, the first defined time period passing interpreted to be an interaction between the user and the most-recently-interacted-with user interface;
    responsive to determining that the defined time period has passed and without further input, updating the queue to reflect the selection of the most-recently-interacted-with application;
    receiving a second gesture over the most-recently-interacted-with user interface, the second gesture selecting a second-most-recently-interacted-with application;
    receiving a third gesture selecting a third-most-recently-interacted-with application within a second defined time period from the queue of interacted-with applications; and
    responsive to the selection of the third-most-recently-interacted-with application being received within the second defined time period of receiving the selection of the second-most-recently-interacted-with application, not updating the queue of interacted-with applications to reflect the selection of the second-most-recently-interacted-with application, the first defined time period being greater than a time threshold and the second defined time period being less than the time threshold, the time threshold being between one and four seconds.

16. A system as recited in claim 15, wherein the presentation of the most-recently-interacted-with user interface progressively places the most-recently-interacted-with user interface at a region of the gesture-sensitive display at which the current user interface resides.

17. A system as recited in claim 15, wherein the presentation of the most-recently-interacted-with user interface includes presentation of a thumbnail image of the most-recently-interacted-with user interface progressively with the first gesture as the first gesture is received and, responsive to the first gesture ending, expanding the thumbnail image.

18. A system as recited in claim 15, wherein the queue of interacted-with applications is not maintained prior to a first user interaction with an application.

19. A system as recited in claim 15, wherein the current user interface currently presented on the gesture-sensitive display fully occupies the gesture-sensitive display without occlusion until presentation of the most-recently-interacted-with user interface and, subsequent to presentation of the most-recently-interacted-with user interface on the gesture-sensitive display, the most-recently-interacted-with user interface fully occupies the gesture-sensitive display.

20. A system as recited in claim 15, wherein receiving the selection of the second-most-recently-interacted-with application followed by receiving the selection of the third-most-recently-interacted-with application within the second defined time period is interpreted to be a quick scanning through of the applications in the queue.

\* \* \* \* \*